Sept. 6, 1960

R. E. ARKO ET AL 2,951,902

PRINTING TELEGRAPH REPERFORATOR

Filed April 2, 1958

INVENTORS
ROBERT E. ARKO
CARL W. SWAN

BY R.C.Terry

ATTORNEY

Sept. 6, 1960

R. E. ARKO ET AL 2,951,902

PRINTING TELEGRAPH REPERFORATOR

Filed April 2, 1958

INVENTORS
ROBERT E. ARKO
CARL W. SWAN

BY *R. C. Terry*

ATTORNEY

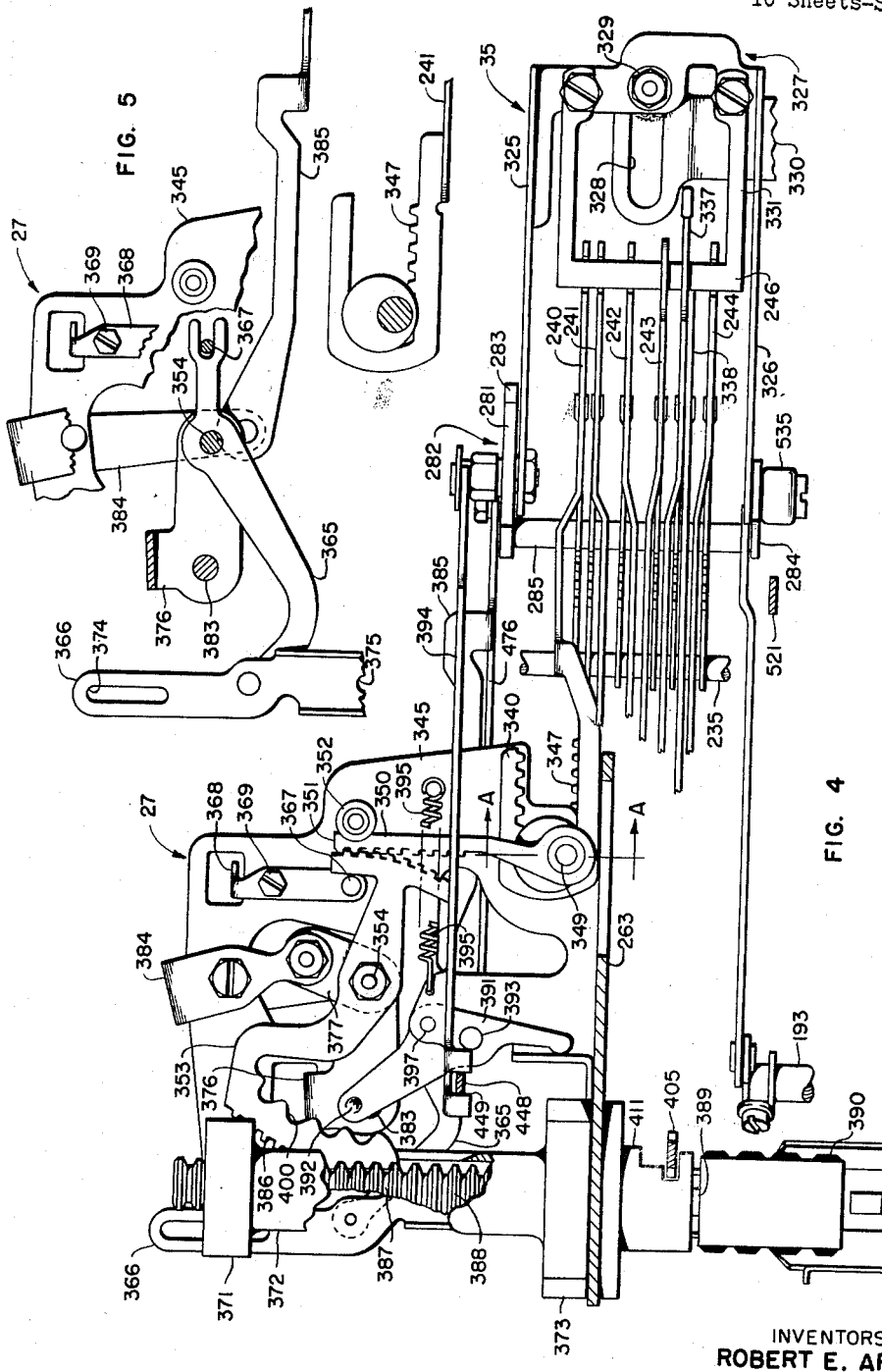

Sept. 6, 1960

R. E. ARKO ET AL 2,951,902

PRINTING TELEGRAPH REPERFORATOR

Filed April 2, 1958

INVENTORS
ROBERT E. ARKO
CARL W. SWAN
BY
R.C. Terry
ATTORNEY

INVENTORS
ROBERT E. ARKO
CARL W. SWAN
BY
R.C.Terry
ATTORNEY

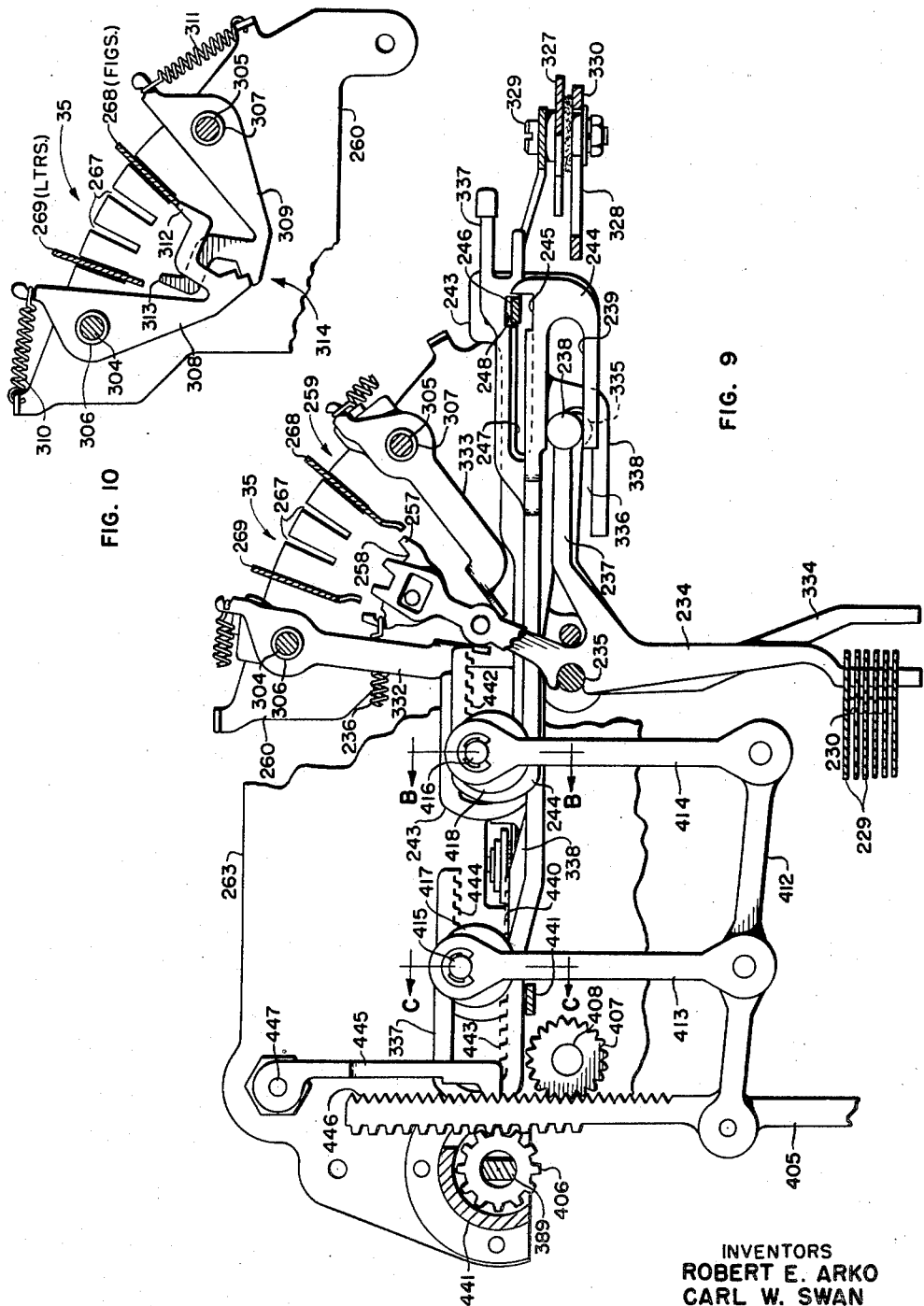

Sept. 6, 1960    R. E. ARKO ET AL    2,951,902
PRINTING TELEGRAPH REPERFORATOR
Filed April 2, 1958    10 Sheets-Sheet 8

INVENTORS
ROBERT E. ARKO
CARL W. SWAN
BY R.C. Terry
ATTORNEY

Sept. 6, 1960 R. E. ARKO ET AL 2,951,902
PRINTING TELEGRAPH REPERFORATOR
Filed April 2, 1958 10 Sheets-Sheet 9

INVENTORS
ROBERT E. ARKO
CARL W. SWAN
BY R. C. Terry
ATTORNEY

Sept. 6, 1960

R. E. ARKO ET AL 2,951,902

PRINTING TELEGRAPH REPERFORATOR

Filed April 2, 1958

INVENTORS
ROBERT E. ARKO
CARL W. SWAN

BY R.C. Terry

ATTORNEY

United States Patent Office 2,951,902
Patented Sept. 6, 1960

---

2,951,902

PRINTING TELEGRAPH REPERFORATOR

Robert E. Arko, Mount Prospect, and Carl W. Swan, Skokie, Ill., assignors to Teletype Corporation, Chicago, Ill., a corporation of Delaware Filed Apr. 2, 1958, Ser. No. 725,935

10 Claims. (Cl. 178—92)

This invention relates to printing telegraph reperforators and more particularly to a mechanism for controlling the functions of a printing telegraph reperforator.

It is an object of the present invention to provide an improved printing telegraph typing reperforator.

Another object of the invention is to provide a printing telegraph apparatus wherein the selection of various functions is effected in a simple and positive manner.

Still another object of the invention is to provide a high speed typing reperforator which includes a simple means for selecting certain functions of the machine for operation.

In accordance with one embodiment of the invention the apparatus comprises a selector mechanism; a punch mechanism; a transfer mechanism; a type wheel positioning mechanism, operating under the control of the transfer mechanism; a function mechanism; a ribbon feed mechanism and a tape feed-out mechanism. Co-operating with the selector magnet assembly is a range finder or orientation device which may be manipulated to properly orient the operation of the perforator to the timing of incoming signals to the selector mechanism.

The selector mechanism is constructed to respond to a signaling code which is a five unit start-stop code of current and no current intervals. Intervals during which the selector magnet is energized are known as marking intervals and those during which the magnet is not energized are known as spacing intervals in this art. As is usual in such apparatus, each group of five selecting intervals is preceded by a start interval (no current) and is followed by a stop interval (current) both of which are used to maintain synchronism between the transmitting apparatus which transmits the signals to the receiving apparatus, and the receiving apparatus as disclosed herein.

The selector mechanism directly controls the selection of punches in the punch mechanism by releasing interposer members to permit them to move to position to be interposed between punches associated with them and a punch actuating bail. As the punch interposer members move to their position between the punch actuator member and the individual punches they will selectively actuate a transfer mechanism including transfer levers and bell crank levers to set up a type wheel positioning mechanism for operation. The type wheel which is positioned under control of the type wheel positioning mechanism consists of four rows of sixteen characters, each evenly spaced on the circumference thereof. Only one character of this group of characters will be presented to a print hammer in each cycle of the apparatus. The axial and rotary positioning of the type wheel is effected through a plurality of gears and racks that operate under control of five push bars representing five code selections and two pull bars which are known as Letters-Figures pull bars.

As is well known, with a five unit start-stop code it is possible to select only a maximum of 32 rotational positions for the setting of the type wheel. Since the alphabet consists of 26 letters and there are 32 code combinations available, two of these code combinations are utilized for shifting the type wheel from a Letters to a Figures position and vice versa by rotating the type wheel in opposite directions through one half of a revolution upon the reception in the apparatus of a code combination indicating that a Letters shift or a Figures shift would be effected. In order to accomplish shifting of the type wheel through a half revolution, the bell cranks, which are set by the transfer mechanism upon the receipt of a code combination of signals in the selector mechanism, are provided with an arrangement of projections and slots along their upper ends which extend into a function box having slidably mounted therein a plurality of function blades. Two of the function blades are assigned respectively to the Letters-Figures functions of the apparatus. Other function blades may be provided in the function box to effect such functions as a ringing of a bell or the closing of a circuit to effect some other operation. The function blades are arranged to sense the projections and slots on the bell cranks in each cycle of the apparatus and if a function blade is permitted to move into aligned slots on the bell cranks it will initiate its individual function.

Once in each cycle of the apparatus a print hammer is actuated to drive the tape upwardly to engage with an inking ribbon that is interposed between the tape and the type wheel. A ribbon feed mechanism is provided for presenting a fresh portion of the ribbon to the print hammer position each time the print hammer is actuated. In addition to the foregoing mechanisms the apparatus is provided with a tape feed-out mechanism so that a predetermined length of tape may be fed out of the apparatus to facilitate the use of the tape either for controlling the transmission of a message or for permitting the printed information on the tape to be more readily interpreted.

A complete understanding of the present invention may be had by reference to the following detailed description when considered in conjunction with the accompanying drawings wherein:

Fig. 4 is a partial sectional view, on a slightly enlarged scale, taken substantially along the line 4—4 of Fig. 1 in the direction of the arrows, showing parts of the function box and type wheel positioning mechanisms in plan;

Fig. 5 is a fragmentary plan sectional view of a portion of the apparatus shown in Fig. 4 taken at a slightly lower level than Fig. 4, showing in greater detail some of the elements shown fragmentarily in Fig. 4;

Fig. 9 is a longitudinal, vertical, sectional view on substantially the same scale as Fig. 4, taken substantially on the line 9—9 of Fig. 3 in the direction of the arrows, showing some of the details of the type wheel positioning mechanism;

Fig. 10 is a fragmentary, longitudinal, vertical, sectional view, taken substantially along the line 10—10 of Fig. 3 in the direction of the arrows, showing more details of the function box;

GENERAL DESCRIPTION

Figure 1:
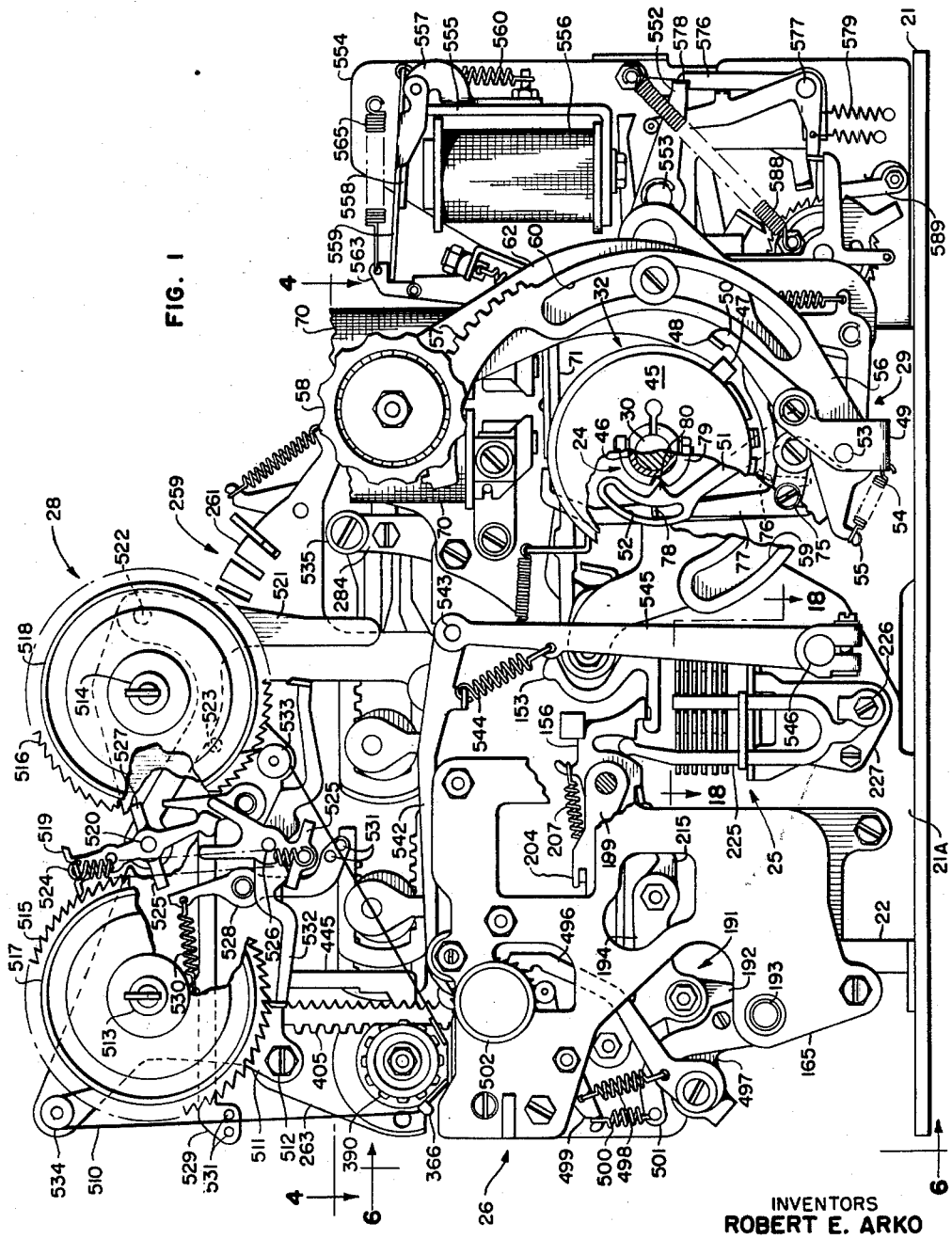
Fig. 1 is a front elevational view of a telegraph printing reperforator which includes the mechanisms comprising a preferred embodiment of the present invention, parts being broken away to show more clearly some of the elements of the apparatus.

In the preferred embodiment of the invention, which is illustrated herein, the apparatus includes a base 21 to which there is fixed a suitable casting 21-A having suitable standards extending upwardly from it such as the standard 22 and a main bracket 23 (Figs. 1, 2 and 6), for supporting the various components of the apparatus. Generally speaking, these components comprise a selector mechanism 24 which is shown most clearly in Figs. 7, 8 and 19, a transfer mechanism 25, which is shown most clearly in Figs. 1, 7 and 18, a punch mechanism 26 shown most clearly in Figs. 1, 6, 7 and 17, a type wheel positioning and printing mechanism 27 and a function mechanism 35 shown most clearly in Figs. 4, 5, 6, 9, 10, 11 and 12, a ribbon feed mechanism 28, shown in Fig. 1 and a tape feed-out mechanism 36 shown most clearly in Fig. 13. The selector mechanism 24 includes a range finder or orienting device designated generally by the numeral 29 (Fig. 1).

The basic design of the selector mechanism 24 is shown and claimed in the patent to W. J. Zenner, No. 2,595,745, issued May 6, 1952, to which reference may be had for details of operation and structure of the selector. Similarly the range finder for the selector is disclosed and claimed in the patent to C. W. Swan, No. 2,642,799, issued January 6, 1953.

The selector mechanism receives its motive power from a main power shaft 30 which is continuously driven by a synchronous motor belt (not shown) that in turn drives a sprocket wheel 31 (Figs. 2 and 3) fixed to the main power shaft 30. There are two similar clutch mechanisms associated with the main power shaft 30 and one of these clutches, that is clutch 32 (Figs. 1 and 19) is operable to connect the selector mechanism 24 to the main power shaft 30. The other clutch which may be termed either the main power clutch or the function clutch is designated by the numeral 33 (Fig. 11), and serves to supply power for operating the various mechanisms which are selectively set up for operation by the selector mechanism 24. Both of these clutch mechanisms 32 and 33 are of the type shown and claimed in the patent to A. N. Nilson et al., No. 2,568,249, issued September 18, 1951.

Figure 6:
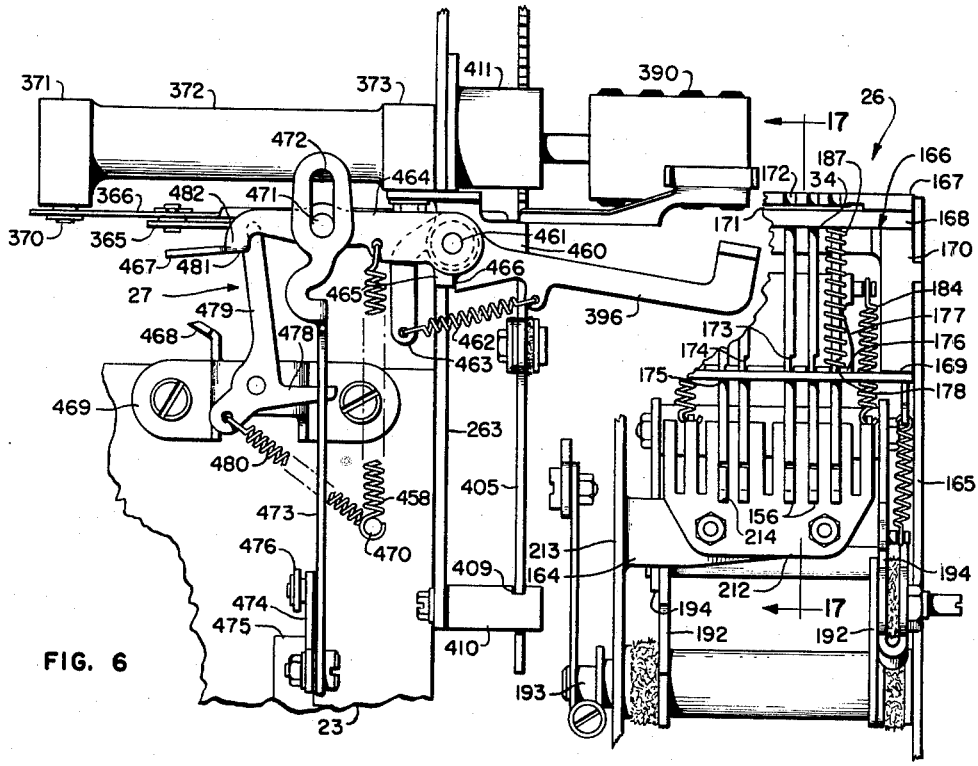
Fig. 6 is a fragmentary and elevational view of the left hand end of the apparatus shown in Figs. 1, 2 and 3 showing parts of the printing and perforating mechanisms, parts being broken away to show some of the parts behind them.
Figures 7, 8:
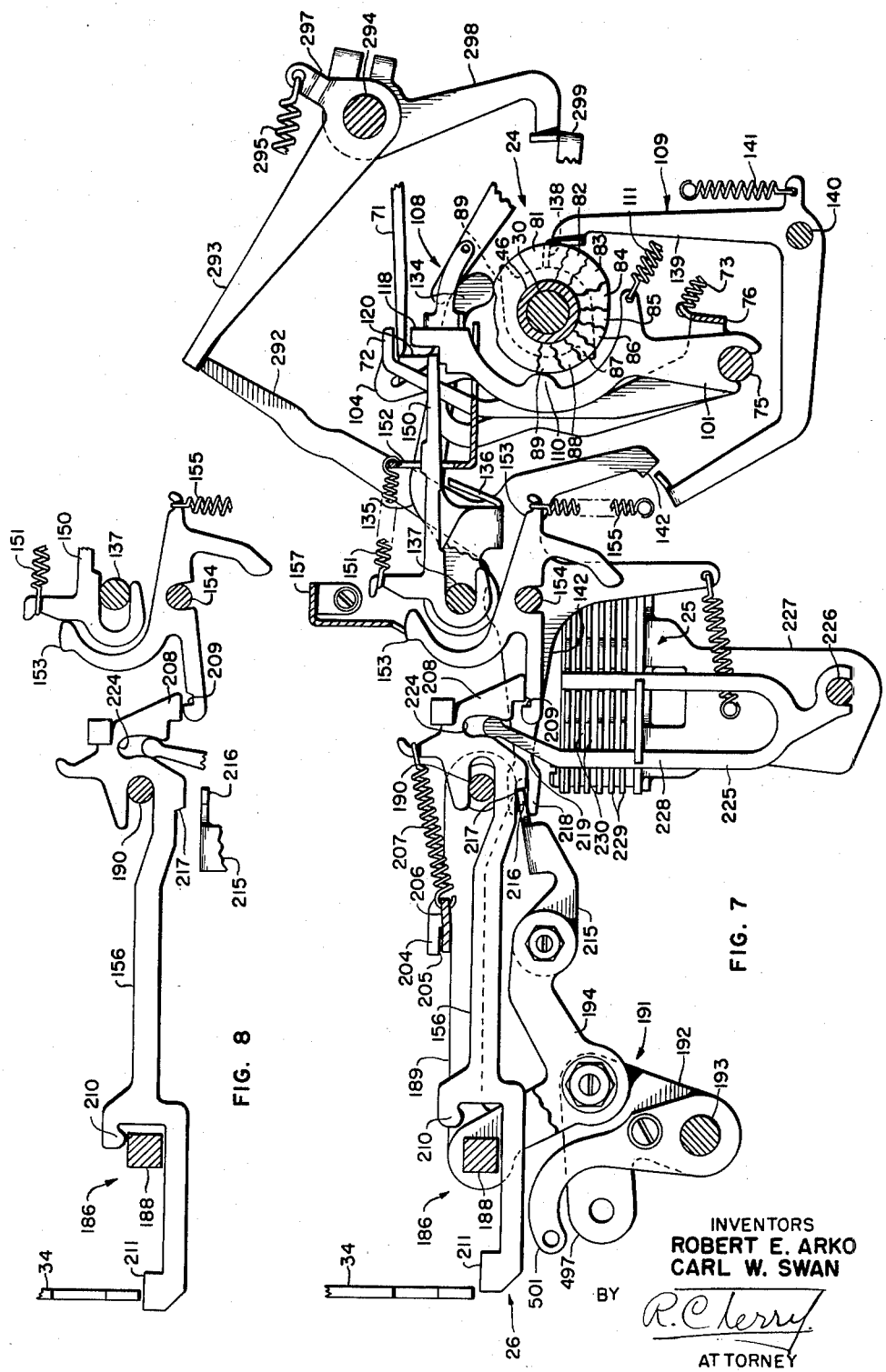
Fig. 7 is a fragmentary longitudinal, vertical sectional view on a slightly enlarged scale, taken substantially along the line 7—7 of Fig. 3 and showing details of the punch selecting mechanism.
Fig. 8 is a fragmentary view of a portion of the apparatus shown in Fig. 7, illustrating the position of some of the elements when a punch is selected for operation.

The selector mechanism 24 serves to select for operation various mechanisms in the apparatus including punches 34 in the punch mechanism 26 (Figs. 6, 7 and 8). The punch mechanism illustrated in the present application is basically the same as the punch mechanism shown in and claimed in the patent to W. J. Zenner, No. 2,490,608, issued December 6, 1949.

Co-operating with the punch mechanism 26 is the type wheel positioning mechanism 27 which is basically the same as the type wheel positioning mechanism shown and claimed in the co-pending patent application of R. E. Arko et al., Serial No. 475,628, filed December 16, 1954, now Patent No. 2,892,031, issued June 23, 1956. The tape feed-out mechanism illustrated in the present application is basically the same as that shown and claimed in the co-pending application of C. W. Swan, Serial No. 487,014, filed February 9, 1955, and the ribbon feed mechanism is basically the same as that shown in the patent to C. W. Swan, No. 1,989,716, issued February 5, 1935.

The present application is primarily concerned with improved mechanism for controlling the type wheel positioning mechanisms and the detailed description which follows will be directed to such apparatus and only so much of the components shown and described in the aforementioned applications and patents will be described as is necessary to a complete understanding of the present invention.

The correspondence between various elements of the present application and the patents and applications mentioned hereinbefore will be quite apparent and reference may be had to the co-pending applications and to the patents referred to for an understanding of the operation of those components.

*Selector mechanism*

The main power shaft 30 is mounted for free rotation in a main support plate 37 fixed to the main bracket 23 and in a rear bearing plate 44 which form part of the casting 21-A (Figs. 2, 3 and 11) and carries the sprocket wheel 31 at its extreme rear end. Mounted on the front end of the main power shaft 30 is the clutch 32 which includes a clutch drum 45 (Fig. 1), that is fixed to the shaft 30 and serves to transmit power from the shaft 30 to a selector cam sleeve 46 on which a plurality of cams are mounted. The clutch 32, as pointed out hereinbefore, is of the type disclosed in detail in the patent to A. Nilsen et al., No. 2,568,249, and is rendered effective to connect the selector cam sleeve 46 to the shaft 30 when a stop projection 47 of a clutch shoe lever such as disclosed in the Nilsen et al. patent is released by an end portion 48 of a stop bail 49.

The stop bail 49 (Figs. 1 and 19) is provided with a horizontally extending arm 50 and a vertically extending arm 51, the end portion 48 of the stop bail being at the extreme end of the horizontally extending arm. An arcuate slot 52, concentric with the axis of the shaft 30, is formed in the vertically extending arm 51 of the stop bail 49. The stop bail 49 is pivoted on a stud shaft 53 and is normally urged to rock in a clockwise direction about the stud shaft by a contractile spring 54 which is attached to the web portion of the bail 49 and to a clutch latch lever 55. The stud shaft 53 is fixed on an orientation plate 56 which has a gear rack portion 57 formed on it for engagement by gear teeth (not shown) on a range finder knob 58.

The orientation plate 56 is substantially arcuate in shape and is provided with a pair of arcuate slots 59 and 60 concentric with the axis of the shaft 30. A pair of shouldered studs 61 fixed to a bracket 62, that is in turn suitably mounted in the apparatus, serve to guide the orientation plate 56 with respect to the bracket 62 when the knob 58 is manipulated. If the orientation plate 56 is moved either clockwise or counterclockwise, by manipulating the knob 58, it will change the position at which the end portion 48 on the horizontal arm 50 of the stop bail 49, will engage with the stop projection 47 of the clutch shoe lever and consequently will determine the time at which the clutch will connect the selector cam sleeve 46 to the shaft 30 as described in detail in the patent to C. W. Swan, No. 2,624,799, mentioned hereinbefore.

The selector mechanism 24 includes a pair of selector magnet coils 70 (Figs. 1 and 3), which upon receipt of a marking or current impulse will attract an armature 71 (Figs. 1 and 7) and upon receipt of a no current impulse will release the armature 71. As is usual in such devices, a normal condition of the line to the electromagnet, when no message is being transmitted, is a current or marking condition and consequently the selector magnet coils 70 (shown as a single coil in Fig. 19), are energized to hold the armature 71 in its uppermost position. When the armature 71 is in the upper or marking position it blocks a start lever 72 (Figs. 7, 15 and 19) from moving, under the influence of a contractile spring 73, to the position in which this lever is shown in Fig. 7. The start lever 72 is pivotally mounted on a pivot shaft 75 and comprises an integrally formed web 76 and a start lever arm 77 (see Figs. 1, 7 15 and 19). Thus the start lever 72, start lever arm 77 and web 76 in effect form a U-shaped lever. The upper end of the start lever arm 77 is bent over to form a projection 78 which extends into the arcuate slot 52 formed in the vertically extending arm 51 of the stop bail 49.

At the start of a signal for any character or function, the start interval, which is no current or spacing, releases the selector armature 71 which then moves away from the selector magnet coils 70 to unlatch the start lever 72. The selector cam sleeve 46 has a start cam 79 on it which has an indentation on its surface that will be directly opposite a camming projection 80 (Fig. 1) on the vertically extending arm 51 of the stop bail 49 when the cam sleeve 46 is in its stop position. Consequently, when the armature 71 releases the start lever 72, the start lever 72 will, through its articulation to the stop bail 49 (by means of the projection 78, start lever arm 77, and vertical arm 51 of the stop bail 49), carry with it the stop bail 49, thus to release the end portion 48 of the horizontal arm 50 from engagement with the stop projection 47 and the selector cam sleeve 46 will start to rotate. As soon as the selector cam sleeve 46 starts to rotate, the start cam 79, in rotating with the sleeve 46, will present a high portion of its surface to the camming projection 80 on the arm 51. Consequently, the start lever 72, due to its connection with stop bail 49, cannot move back to engage the armature 71 until the selector cam sleeve has completed one complete revolution at which time the projection 80 on the arm 51 will again be aligned with the indentation in the start cam 79.

In addition to the start cam 79, the selector cam sleeve 46 (Fig. 7) has on its five selector cams 81, 82, 83, 86 and 87, a spacing lock lever cam 84, a marking lock lever cam 85, a reset bail cam 88, and a function clutch cam 89. These cams are arranged on the selector cam sleeve 46 in the following order: number 5 selector cam 81; the number 4 selector cam 82; the number 3 selector cam 83; the spacing lock lever cam 84; the marking lever cam 85; the number 2 selector cam 86; the number 1 selector cam 87; the reset bail cam 88; and the function clutch cam 89 reading from the front of the selector cam sleeve 46 to the rear end thereof. These cams just described are substantially the same as the cams described in detail in the patent to W. J. Zenner, No. 2,595,745, mentioned hereinbefore and have associated with them various cam levers which are spring urged to engage camming projections on them with the surface of their respective cams.

As described hereinbefore the start lever 72, because of its connection with the stop bail 49, co-operates with the start cam 79 and will follow the contour of the start cam 79 unless blocked from engagement with the start cam 79 by the armature 71. The selector cams 81, 82, 83, 86 and 87 have associated with them selector cam levers 101, 102, 103, 106 and 107 respectively; the spacing lock lever cam 84 has associated with it a spacing lock cam lever 104; the marking lock cam 85 has associated with it a marking lock cam lever 105; the reset bail cam 88 has associated with it a reset bail cam lever 108, and the function clutch cam 89 has associated with it a function clutch cam lever 109. The selector cam levers 101, 102, 103, 106 and 107 are all of exactly the same construction and, as will be seen by reference to Fig. 15 where the selector cam lever 106 is shown in detail, the selector lever 106 is provided with a camming projection 110 which, when lever 106 is selected, engages the surface of its associated selector cam 86 and is urged to follow the contour of the cam by a contractile spring such as the contractile spring 111 shown associated with the selector cam lever 110 in Fig. 7. The selector cam 106 is provided with a rounded notch 112 at its bottom end so that it may pivot on the shaft 75. At its upper end the selector cam 106 has two push bar engaging shoulders 116 and 117 and a surface 118 for engagement with a laterally extending projection 119 on the marking lock cam lever 105.

The marking lock lever 105 (Fig. 15) has a pair of laterally extending projections 119 and 120 extending on opposite sides of it. When the marking lock lever 105 is blocked from following the contour of its cam, due to the fact that the armature 71 is in a spacing position, the laterally extending projection 119 will block the selector cam levers 106 and 107 from following the contour of their respective cams and the laterally extending projection 120 will block the selector cam levers 101, 102, and 103 from following the contour of their respective cams. The marking lock lever 105 is provided with a rounded notch 121 at its lower end so that it may freely pivot on the shaft 75. At its upper end the marking lock cam lever 105 is provided with a surface 122 which will engage the armature 71 when the armature 71 is in a spacing position thus to block the marking lock lever 105 from following the contour of its cam 85 when a spacing interval occurs. Adjacent its upper end the marking lock lever 105 has a horizontally disposed surface 123 which, when the lever 105 is permitted to rock to its clockwise position, will engage the under surface of the armature 71 to hold the armature 71 in a marking position until the next signal transition is due at which time the marking lock lever 105 will be cammed to its counterclockwise position.

The spacing lock cam lever 104 is provided with a rounded notch 124 adjacent its lower end for engagement with the shaft 75 so that the spacing lock lever may freely pivot on the shaft 75. At its upper right hand end the spacing lock lever 104 is provided with a surface 125 that will engage the edge of the armature 71 when the armature is in a marking position and the camming projection 114 of the spacing lock lever 104 permits the spacing lock lever to follow the contour of its cam. The under surface of the upper end of the spacing lock lever 104 has a notch cut in it to provide a surface 126 that will engage the upper surface of the armature 71 when the armature 71 moves to spacing position thus to lock the armature 71 in that spacing position until a next signal transition is due.

The configuration of the levers which co-operate with the reset bail cam 88 and the function clutch cam 89 will be apparent by reference to Fig. 7 wherein it will be seen that the reset bail lever 108 has a cam follower portion 134, a horizontally disposed portion 135 and a web portion 136, and is pivoted on a stationary shaft 137.

The function cam lever 109 (Fig. 7) has a cam follower portion 138 on a vertically extending arm 139 thereof and is urged to rotate about a stud shaft 140 by a contractile spring 141. When the high portion of the function clutch cam 89 comes into engagement with the cam follower portion 138 the lever 109 will be rocked about the stud shaft 140 in a clockwise direction to rock a four armed lever 142 in a counterclockwise direction about the shaft 137.

Figure 14:
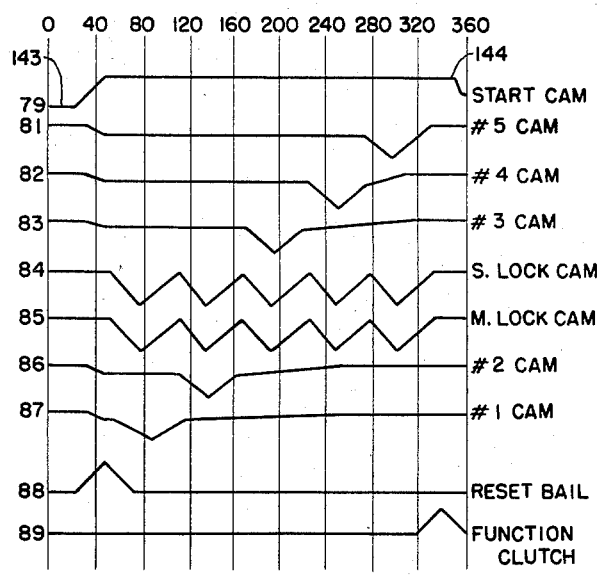
Fig. 14 is a timing chart, showing the sequence of operation of various components of the selector mechanism.

The timing of the various cams on the selector cam sleeve 46 will be apparent by reference to Fig. 14 which shows that the start cam 79 has a low portion 143 at the zero position of the sleeve 46. It will be understood however, that a marking condition (current) prevails and the magnets 70 are energized when there is a closed line circuit, the right end (Fig. 7) of the lever 72 will be resting against the edge of the armature 71. Upon the receipt of a start signal, which is spacing, the armature 71 will fall to the position shown in Fig. 7 and consequently the start cam lever 72 will rock clockwise about the shaft 75 and will trip the clutch 32 for the selector mechanism thereby to initiate a cycle of rotation of the selector cam sleeve 46. Immediately after the clutch 32 is tripped the start lever 72 will ride up on to the high portion 144 of its cam 79 and will be held in that position until just before the end of the cycle of the sleeve 46.

In Fig. 14 the reference numerals assigned to the various cams are at the left of the timing chart and are aligned with the lines which represent the action of the various cams. It should be noted that each of the selector cams 81, 82, 83, 86 and 87 have a raised dwell portion at zero degrees or the start position of the cam sleeve 46. Shortly after the cam sleeve 46 starts to rotate all of the selector cams present a lower dwell portion to their respective cam levers. Then in timed relation the cams 87, 86, 83, 82 and 81 will present indentations to their respective cam levers. The spacing lock cam 84 and the marking lock cam 85 each have four indentations which correspond to the indentations in the various selector cams so that the spacing lock cam lever 104 and the marking lock lever cam 105 will be released five times in each cycle and will individually move to their blocking positions depending upon whether a marking or spacing condition occurs at the interval when they are released.

If a marking condition exists the marking locking lever 105 (Figs. 15 and 19) will be permitted to move inwardly and will permit the particular selector lever, which finds an indentation in its cam, to move in with the marking lock lever and the marking lock lever will lock the armature 71 in its upper position. If a spacing condition prevails at a given interval then the spacing lock lever 104 will then be permitted to move in over the armature 71 to lock it and hold it while the particular selector cam lever which may or may not be effective at that period will be blocked from following the contour of its respective cam by the laterally extending projections 119 or 120 on the marking lock lever 105, which will be blocked from entering its cam indentation due to the fact that the armature 71 will engage the surface 122 of it.

The reset bail cam lever 108 associated with cam 88 will be operated early in the cycle of rotation of the cam sleeve 46 and will restore a series of punch selector bars, to be described more in detail hereinafter, which are associated with the various selector cam levers, to position to be actuated by these levers. Near the end of the cycle of rotation of the sleeve 46 the function clutch cam 89 will actuate its cam lever 109. This mechanism is substantially the same as that disclosed in Patent No. 2,595,745, to W. J. Zenner.

Any one of the selector cam levers 101, 102, 103, 106 or 107 which is permitted to rock clockwise about the shaft 75, due to a marking condition prevailing at the time interval when the indentation in its respective cam 81, 82, 83, 86, and 87 is aligned with its cam follower projection, will permit a push bar 150 (Figs. 7 and 19) which is slidably and pivotally mounted on the stationary shaft 137 to rock clockwise under the influence of its actuator spring 151. The push levers 150 are guided adjacent their mid-point by a slotted bracket 152 which serves as an anchor point for the springs 151 and also serves to guide the push levers 150 in alignment with their respective selector cam levers.

Figure 15:
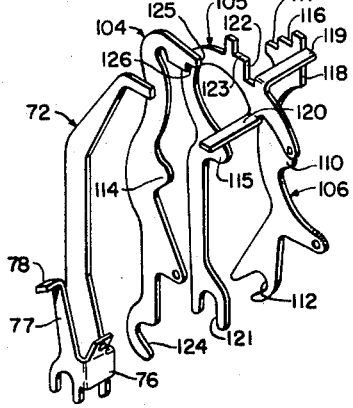
Fig. 15 is a view in perspective showing the configuration of the levers used in the selector mechanism.

As will be apparent by reference to the timing chart shown in Fig. 14 the reset bail cam 88 is effective to rock the reset bail cam 108 counterclockwise about the shaft 137 very early in the cycle. At this time the web portion 136 of the reset cam lever 108 will engage the under side of all of the push levers 150 that have been selected on a previous cycle and will lift the push levers 150 onto the upper push bar engaging shoulder 116 (Fig. 15). In the event that one of the selector cam levers 101, 102, 103, 106 or 107 is selected for operation it will tend to follow the contour of its respective cam 81, 82, 83, 86 or 87 and consequently will rock in a clockwise direction about the shaft 75 far enough to permit its associated push lever 150 to drop down onto the lower push bar engaging shoulder 117 of the selector lever. When a push lever 150 is on the lower shoulder 117, of one of the selector cam levers, the push lever 150 will be moved to the left with respect to its shaft 137 as the selector cam lever is rocked counterclockwise due to the cam follower projection on it engaging the high or dwell portion of its respective cam.

When a push lever 150 is moved to the left (Fig. 7) it will engage a selector slide latch 153 individual to it and will rock the latch 153 about a pivot shaft 154 against the action of a contractile spring 155. There is one selector slide latch 153 for each of the push levers 150. Consequently, when a push lever 150 is selected and actuated by its associated selector cam lever, a selector slide latch 153 will be rocked counterclockwise about the shaft 154. The spring normally holds the selector slide latch 153 in latching engagement with a punch selector slide 156. A slotted guide bracket 157 holds the selector slide latches 153 in alignment with five push levers 150 and with the punch selector slides 156. There are five of the punch selectors 156 provided in the apparatus one being associated with each of the selector slide latches 153 and there is one selector slide latch 153 associated with each one of the five selector cam levers 101, 102, 103, 106 and 107.

Punch mechanism

The punch mechanism 26 as most clearly illustrated in Figs. 1, 6, 7, 8 and 17 comprises a rear plate 164 (Fig. 6) and a front plate 165 between which there is mounted a punch block designated generally by the numeral 166 and made up of a die plate 167, an upper guide plate 168, a lower punch guide plate 169 and two spacer blocks 170 of identical construction that are fixed to the front and rear plates 165 and 164 respectively. Only the block 170 that is fixed to the plate 165 is shown in Fig. 6 but it will be understood that the blocks 170 serve to hold the guide plates 168 and 169 in spaced relation to guide the punches 34 in suitable guide holes formed in the guide plates.

The die plate 167 (Figs. 6 and 17) is superposed on the upper guide plate 168 and has its bottom surface cut away to form a tape guide slot 171 between the die plate 167 and upper guide plate 168. The die plate 167 has die slots 172 formed in it which are aligned with punch guiding apertures in the guide plates 168 and 169 and the upper end of the punches 34 are beveled so that the tape punched in the apparatus will be of the so called "chadless" type which is described in detail in U.S. Patent 2,255,794, issued to R. A. Lake on September 16, 1941.

Each of the punches 34 has a portion of it milled away to provide a reduced portion 173 and a pair of spaced shoulders 174 and 175 engageable with the upper and lower surfaces respectively of a horizontally extending portion 176 of a stripper bail 177. The portion 176 of the bail 177 has slots 178 formed in it to receive the reduced portion 173 of the punches 34. The bail 177 has two arms 180 which extend toward the right, as viewed in Fig. 17, and serve to pivotally support the bail on a pivot shaft 181 mounted in horizontally extending projections 179 of the spacer blocks 170. A pair of rounded notches 182 formed in the upper surfaces of the arms 180 have set into them a rod 183 to which are attached the upper ends of suitable springs 184. The other ends of the springs 184 are attached to a bracket 185 mounted on a punch actuator bail 186. These springs 184 therefore tend to hold the stripper bail 177 down on the lower guide plate 169 and also tend to raise the punch actuator bail 186. The number 1 and number 5 punches 34 have coiled springs 187 surrounding them and bearing against the underside of the upper guide plate 168 and the upper surface of the horizontal projection 176 of the stripper bail 177, thereby tending to hold the stripper bail 177 in the position shown in Figs. 6 and 17 where the punches 34 will be held in their retracted position.

The punch actuator bail 186 (Figs. 7 and 17) comprises a cross bar 188 which is rectangular in cross section and is fixed to a pair of arms 189 pivoted on a shaft 190. The punch actuator bail 186 is oscillatable about the shaft 190 by means of a toggle mechanism generally designated by the numeral 191. The toggle mechanism 191 comprises a pair of bell crank levers 192 fixed to an oscillatable shaft 193 and a second pair of bell cranks 194 pivoted on the bell cranks 192 and also pivotally attached to the cross bar 188 of the punch actuator bail 186.

Each of the arms 189 of the punch actuator bail 186 is provided with a projection 204 in which there is formed a slot 205 to receive a cross bar 206. The cross bar 206 serves as an anchor for plurality of contractile springs 207, one contractile spring 207 being provided for each of the punch selector slides 156 which are slidable on and pivotable about the shaft 190 and which are urged by their respective springs 207 to move to the left as viewed in Figs. 7 and 8. Each of the selector slides 156 has a latching portion 208 formed on it which co-operates with a latching shoulder 209 formed on its associated selector slide latch 153 so that when the selector slide latch 153 is in the position shown in Fig. 7 the latching portion 208 of the punch selector slide 156 will catch on the latching portion 209 and will prevent the selector slide from moving to the left. However, when the selector slide latch 153 is rocked to the position shown in Fig. 8 by the push lever 150 associated with it, the latching shoulder 209 will be moved out of engagement with the latching portion 208 and the spring 207 will move the punch selector slide 156 to the left, to the position shown in Fig. 8, where a shoulder 210 on it will extend over the top of the cross bar 188.

When the punch actuator bail 186 (Fig. 8) is moved upwardly due to the rocking of the bell crank lever 192 in a counterclockwise direction about the axis of the shaft 193, any of the punch selector slides 156, which have been selected and released by their associated selector slide latches 153, will be moved upwardly. In moving from the position shown in Fig. 7 to the position shown in Fig. 8, a punch selector slide 156 will carry a head portion 211 on it, into position beneath its associated punch 34, being guided in its movement by a slotted guide plate 212 (Fig. 6) which is mounted on a bracket 213 in turn fixed to the rear supporting plate 164. The guide plate 212 has a plurality of slots 214 formed in it, one slot 214 being provided for each of the punch selector slides 156.

Any of the punch selector slides 156 which have been moved to the left (Figs. 7 and 8) to select an associated punch 34 for actuation will be restored to their latched condition as shown in Fig. 7 before the first selector time interval. This restoration is effected by a bail 215 which is pivotally mounted on the free ends of the bell cranks 194 and which has a lip 216 that will be moved up into engagement with a shoulder 217 formed on each one of the punch selector slides 156. The lip 216 of the bail 215 rides between the furcations of a forked extension 219 of the trip lever 142. The lever 142 will be restored to the position shown in Fig. 7 late in the cycle of operation of the apparatus as a whole and consequently, will not move the lip 216 to the position shown in Fig. 7 until near the end of the cycle of the apparatus. Since the trip lever 142 is tripped late in cycle of operation of the selector it will during most of the cycle of the apparatus hold the bail 215 in the position shown in Fig. 8.

*Transfer mechanism*

Each of the punch selector slides 156 has a notch 224 formed in it near its right end (Figs. 7 and 8). This notch 224 is adapted to receive the rounded end of one arm of a U-shaped lever 225 which is pivotally mounted on a shaft 226 in turn fixed to a bracket 227 that is mounted on the main bracket 23 of the apparatus. The bracket 227 supports a guide plate 228 which is provided with a series of slots for receiving and guiding both legs of the U-shaped levers 225. There is provided one U-shaped lever 225 for each of the punch selector slides 156 and each time one of the punch selector slides 156 is released by its associated latch 153 the punch selector slide will rock its associated U-shaped lever 225 in a counterclockwise direction about the shaft 226.

Superposed on the guide plate 228 are a series of spacer plates 229 and pulse beams 230 alternately arranged.

The pulse beams 230 (Figs. 7 and 18) are all of a similar construction and are pivotally mounted between the spacer plates 229 on pivot pins 231. The pulse beams 230 are not identical in construction due to the fact that their pivot points are spaced along the spacer plates 229. Each of the pulse beams 230 is provided with a forked end to provide two inwardly projecting and oppositely disposed portions 232 designed to engage the right hand arm (Figs. 7 and 18) of the associated U-shaped lever 225 between them so that when a U-shaped lever 225 is rocked about its pivot 226 it will rock one of the pulse beams 230 individual to it about the pivot pin 231 for that pulse beam. The right hand arm (Fig. 7) of each of the U-shaped levers 225 will thus rock the pulse beam 230 individual to it but will not interfere with nor move any other of the pulse beams. The end of each of the pulse beams 230 which extends toward the rear of the apparatus, the left as viewed in Fig. 18, has a bell crank engaging projection 233 on it which will engage a bell crank 234 individual to it.

Figure 18:
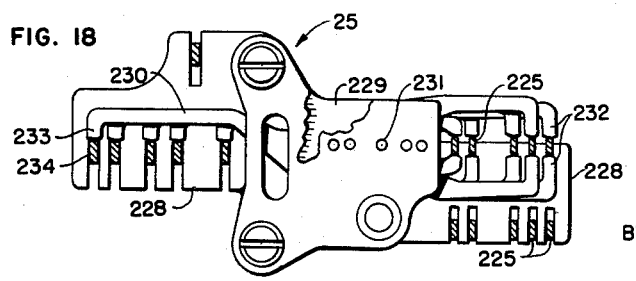
Fig. 18 is a plan sectional view, taken substantially along the line 18—18 of Fig. 1 in the direction of the arrows.

As can best be seen by reference to Fig. 18 the bell cranks 234 are guided in suitable slots formed in the guide plate 228 and as shown in Fig. 9 are pivoted on a stud shaft 235 and urged to rock counterclockwise (Fig. 9) by contractile springs 236 individual to them. Each of the bell cranks 234 has an arm 237 formed on it which has a rounded protuberance 238 at its extreme end for engagement in a slot 239 individual to each one of a plurality of push bars 240, 241, 242, 243 and 244 (Fig. 4). The push bars 240, 241, 242 and 244 have notches such as the notch 245 (Fig. 9) formed in their upper surfaces so that when a bell crank lever 234 associated with one of these push bars is permitted to rock counterclockwise about its pivot shaft 235, the notch 245 will be brought into registry with a push bar bail 246 so that if the bail 246 is moved to the left (Fig. 9) any of the push bars 240, 241, 242 or 244 that have been brought into register with it will be moved to the left with the bail 246 (Figs. 4 and 9). The push bar 243 on the other hand will always move with the bail 246 unless its associated bell crank 234 is rocked in a counterclockwise direction by its associated spring 236. This is due to the fact that the push bar 243 has a cut-out 247 formed in it which communicates with an upwardly extending notch 248 normally in registry with bail 246. The push bar bail 246 is thus normally in engagement with the notch 248.

The push bars 240, 241, 242, 243 and 244 are articulated to the U-shaped levers 225 through their associated pulse beams 230 in the following order: the push bar 243 is associated with the U-shaped lever 225 that is closest to the front of the apparatus, the push bar 242 is associated with the second U-shaped lever 225 from the front of the apparatus, the push bar 244 is associated with the U-shaped lever 225 which is the third from the front of the apparatus, the push bar 240 is associated with the U-shaped lever 225 which is the fourth from the front of the apparatus, and the push bar 241 is associated with the U-shaped lever 225 which is the fifth from the front of the apparatus. The rocking of any of the bell cranks 234 is permissive in nature, that is, they are normally blocked from rocking counterclockwise under the influence of their respective springs 236 by the punch selector slides 156 in the position shown in Fig. 7.

As pointed out hereinbefore the punch selector slides 156 are urged to move to the left (Figs. 7 and 8) thus to rock their associated U-shaped levers 225 in a counterclockwise direction but the punch selector slides are blocked from moving to the left, to the position in Fig. 8 by the selector slide latches 153 associated with them. Consequently, the U-shaped levers 225 will tend to hold the pulse beams 230 in a position where the pulse beams will hold the bell crank levers 234 against movement counterclockwise by their respective springs 236.

Figure 3:
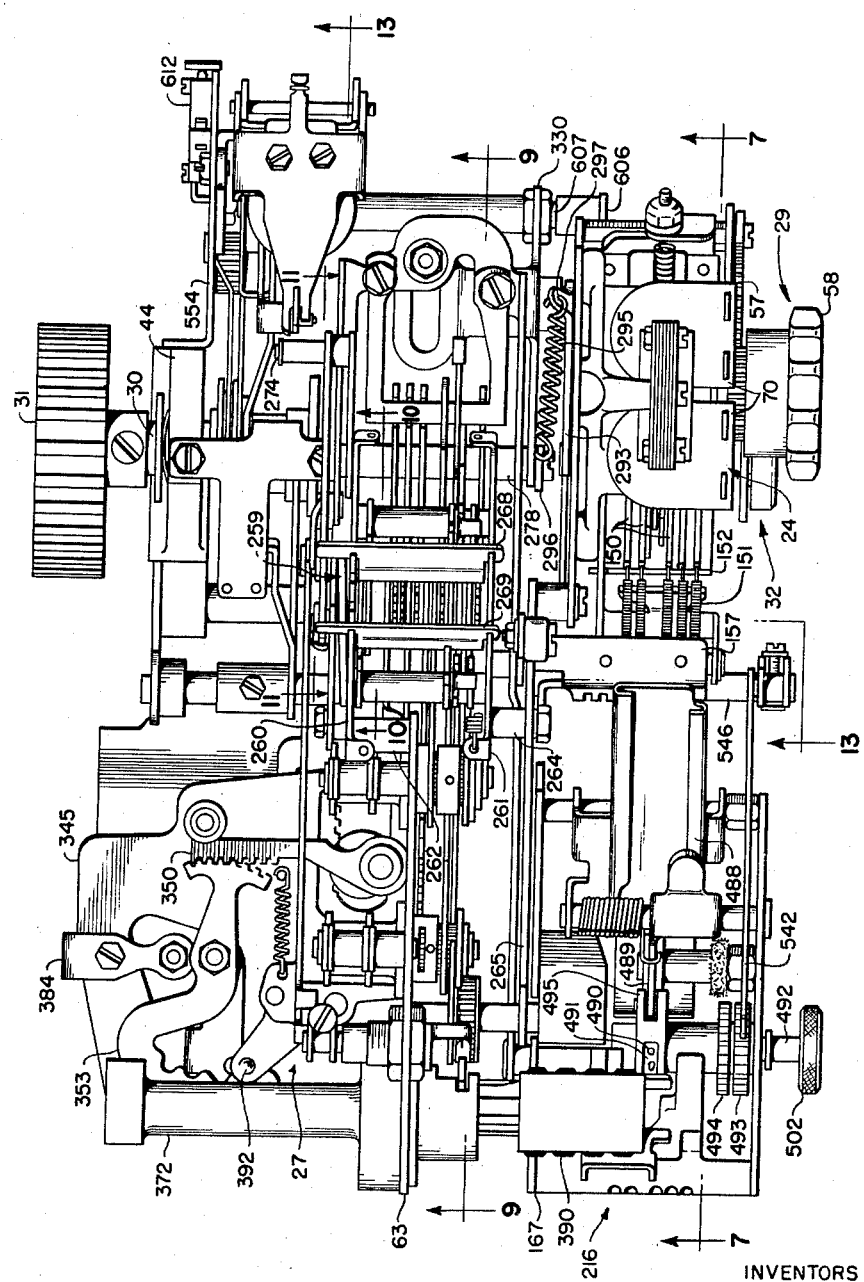
Fig. 3 is a top plan view of the apparatus shown in elevation in Fig. 1 and Fig. 2, parts also being broken away in this view to show more clearly some of the mechanisms at a lower level of the apparatus.

The upper end of each of the bell cranks 234 is provided with a coded arrangement of projections and slots 257 and 258, respectively (Fig. 9) which are so positioned as to extend into a function box designated generally by the numeral 259. The function box 259 comprises a pair of side plates 260 and 261, (Figs. 1, 3 and 9). The side plate 260 is supported by a post 262 (Fig. 3) fixed to a main support plate 263, which is suitably fixed to the casting 21 and the side plate 261 is supported by a post 264 on a secondary support plate 265 also suitably mounted on the casting 23. The upper edges of the side plates 260 and 261 are arcuately shaped and have slots 267 formed in them for the reception of function blades, such as the function blades 268 and 269.

In the present embodiment of the invention there are only two function blades shown, that is the function blades 268 and 269, but since there are four slots 267 formed in the plates 260 and 261 other function blades could be mounted in these slots for selective operation to effect other functions than the Letters-Figures functions effected by the blades 268 and 269.

Figure 2:
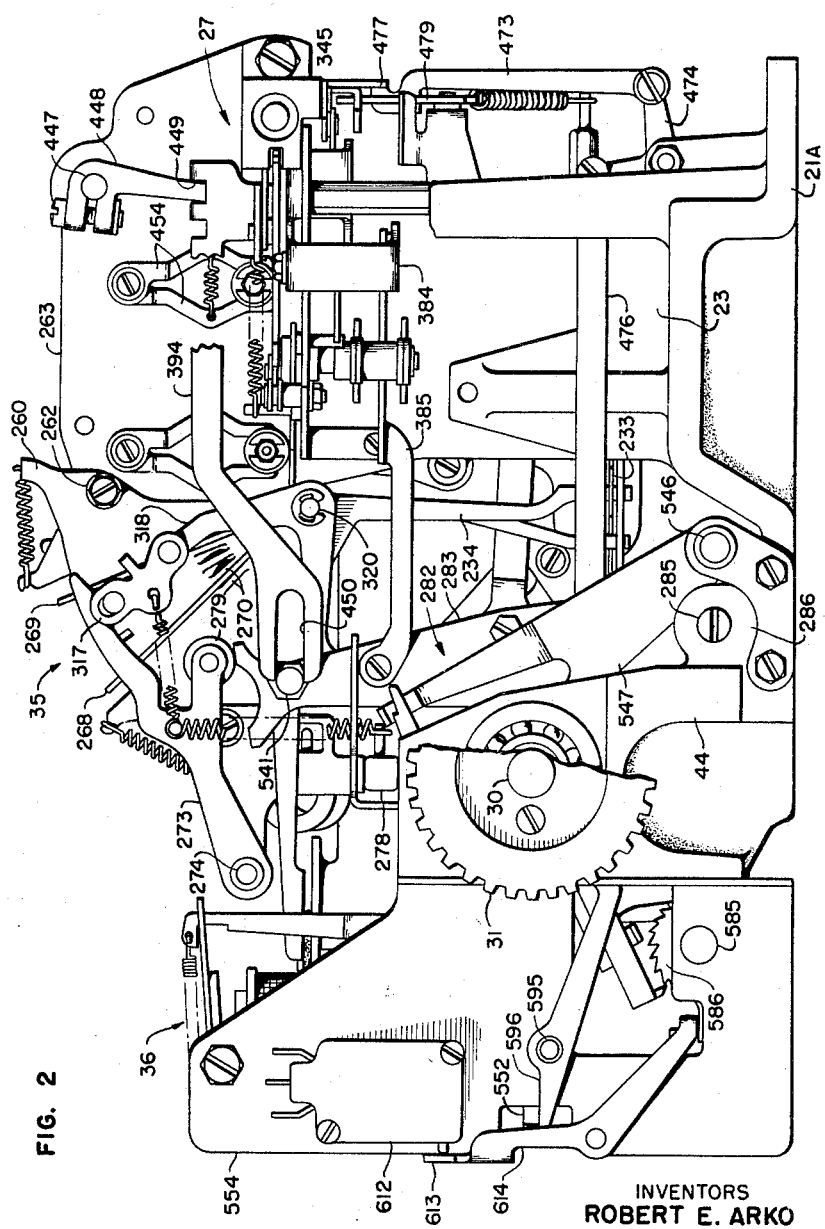
Fig. 2 is a rear elevational view of the apparatus shown in Fig. 1, parts being broken away to show more clearly some structural features of the apparatus.
Figure 11:
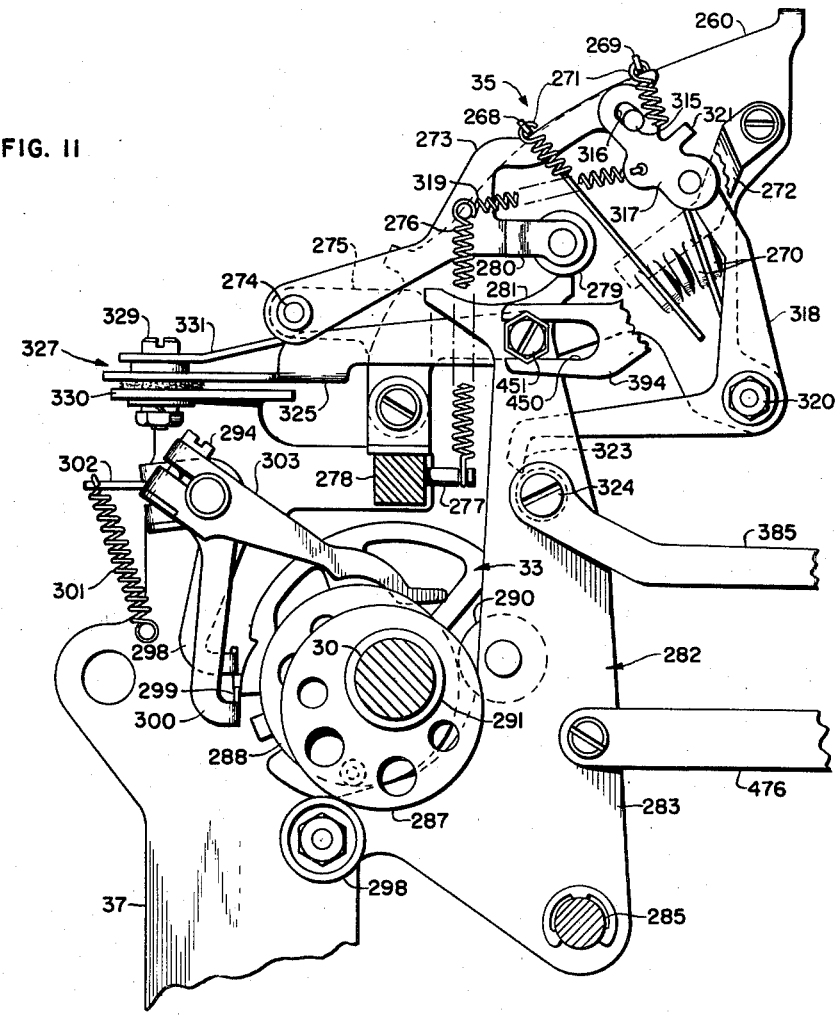
Fig. 11 is an enlarged fragmentary, vertical, sectional view, taken substantially along the line 11—11 of Fig. 3 in the direction of the arrows, showing some of the driving mechanism of the apparatus.

The function blades 268 and 269 are slidable in their respective slots 267 and have slots cut in them adjacent their ends which ride in the side plate 260 whereby the function blades will slide vertically. Extensions of the function blades as shown most clearly in Figs. 2 and 11 are guided at the lower ends thereof by a series of embossings 270 which co-operate to form guide slots for the reception of the lower ends of the function blades 268 and 269 or any other function blades which might be used in the apparatus. The function blades 268 and 269 are normally urged downwardly by contractile springs 271 (Fig. 11) which are attached to the function blades 268 and 269 adjacent the top of the blades and also attached to a bracket 272 mounted on the side plate 260. Only a fragment of the bracket 272 is shown in solid lines and the remainder in dot and dash lines so that parts of the apparatus positioned in back of the bracket will not be obscured.

Throughout most of the cycle of the apparatus the function blades are held in their uppermost position against the action of their respective springs 271 by a blade lifter 273 which is pivotally mounted on a pivot pin 274 that is mounted on an extension 275 of the side plate 260. The pivot pin 274 oscillatably supports the lifter 273 which is urged to oscillate in a clockwise direction about the pivot pin by a contractile spring 276 that is fixed to the lifter 273 and to a pin 277 extending from a cross bar 278 that is in turn suitably supported from the main casting of the machine. A cam roller 279, freely rotatable on an extension 280 of the lifter 273, co-operates with a cam surface 281 of a rocker bail 282.

The rocker bail 282 (Figs. 2, 4 and 11) comprises a pair of arms 283 and 284 fixed to a rock shaft 285. The rock shaft 285 is oscillatably mounted in a bearing 286 (Fig. 2) and oscillation is imparted to the shaft 285 by a pair of cams 287 and 288 (Fig. 11) which co-operate with cam rollers 289 and 290 mounted on opposite sides of the arm 283. The cams 287 and 288 are fixed to a cam sleeve 291 that is mounted on the power shaft 30 and will be driven by the main power shaft 30 when the clutch 33 is tripped. As will be evident by reference to Fig. 14 the clutch 33 is tripped near the end of the cycle of the selector cam sleeve 46. The tripping of the function clutch 33 is effected when the four armed lever 142 is rocked in a clockwise direction by the lever 109 (Fig. 7) which will move an arm 292 of lever 142 out of blocking engagement with a lever 293. The lever 293 is fixed to a shaft 294 (Figs. 7 and 11) that is freely rotatable in the support bracket 37. The shaft 294 is urged to rock counterclockwise, as viewed in Fig. 7, by a spring 295 anchored on a projection 296 (Fig. 3), extending upwardly from the support bracket 37 and attached to a short lever 297 (Figs. 3 and 7) fixed to the shaft 294.

As it will be seen by reference to Figs. 7 and 11, a clutch trip lever 298 is also fixed to the shaft 294 and is normally in blocking relation to a clutch shoe lever 299. When the clutch trip lever 298 is rocked counterclockwise as viewed in Fig. 7 (clockwise as viewed in Fig. 11), it will release the clutch shoe lever 299 and permit the clutch 33 to engage and drive the function cam sleeve 291 through a complete cycle of revolution. A lock lever 300 (Fig. 11) is freely rotatable on the shaft 294 and is urged to rock in a counterclockwise direction (Fig. 11) about the shaft 294 by a contractile spring 301 which is connected to an arm 302, extending from the lever 300, and to the support plate 37. Also fixed to the shaft 294 is a restoring lever 303 which rides on a cam (not shown) fixed to the sleeve 291 and which will rock the shaft 294 in a counterclockwise direction, as viewed in Fig. 11, clockwise as shown in Fig. 7, to rock the lever 293 to the position shown in Fig. 7 thereby to permit the arm 292 to snap back under the lever 293 and restore the clutch tripping mechanism to its normal condition.

The function blade lifter 273 has a pin 315 (Figs. 2, 11 and 12) mounted at its free end to enter into a slot 316 in a toggle link 317 that is pivoted on a bellcrank lever 318. The toggle link 317 is urged to rock in a clockwise direction (Figs. 2 and 11) about the pin 315 by a contractile spring 319. The bell crank lever 318 is pivoted on a pivot stud 320 fixed in the plate 260 and will be rocked to the position shown in full lines in Fig. 12 by the link 317 moving under the influence of the spring 319. The link 317 has a horizontally projecting lip 321 formed on it adjacent to its mid-portion for engagement with a downwardly projecting portion 322 of the function blade lifter 273. When the lip 321 engages the projection 322 the toggle link 317 is blocked from rotating beyond the position shown in Fig. 12 and consequently will hold the lever 318 in the position shown in Fig. 12 where the lifter 273 will be held in an upper position thus to prevent the function blades such as the blades 268 and 269 from moving down into engagement with the upper surfaces of the bell cranks 234 so long as the lever 318 is held in the position shown in Fig. 12

The bell crank lever 318 has a camming extension 323 formed on it which will be engaged by a pin 324 fixed in the arm 283 of the rocker bail 282 when the rocker bail 282 comes into its rest position as shown in Fig. 11 to cam the lever 318 clockwise. This camming action in rocking the lever 318 in a clockwise direction will cause the lip 321 of the toggle link 317, to be disengaged from the portion 322 of the function blade lifter 273 and will permit the cam roller 279 to come into engagement with camming surface 281 of the arm 283. The springs 271 will then move the function blade such as the blades 268 and 269 downwardly a very short distance but sufficiently so that, on the movement of the bail 282 in a clockwise direction (Figs. 11 and 12) about the axis of its shaft 285, the springs 271 will overcome the effect of the spring 319 and the cam roller 279 will follow the contour of the cam surface 281 thus to permit the function blades 268 and 269 to move downwardly and engage with any projections 257 of the bell cranks 234 (Fig. 9) which may be in their path or will permit one of the function blades to enter the notches 258 in the upper surface of the bell cranks 234.

Figure 12:
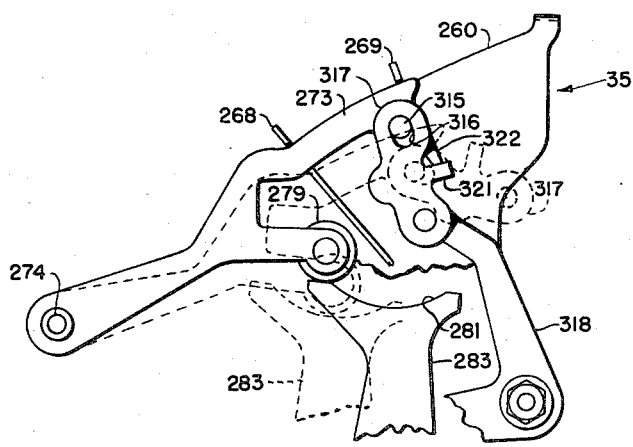
Fig. 12 is a fragmentary view of some of the mechanism shown in Fig. 11 showing the parts in another position that they assume upon being actuated.

When the function blade lifter 273 is thus moved downwardly, the toggle link 317 will assume the position shown in the dotted lines in Fig. 12 and will remain in that position until the lifter 273 is returned to its upper position as shown in solid lines in Fig. 12 by the cam roller 279 riding up on to the high part of the camming surface 281 at the left end of the camming surface 281. When the cam roller 279 rolls up on the left hand upper surface of the camming surface 281 the toggle link 317 will snap back to the position shown in solid lines in Fig. 12 and will hold the lifter 273 in its uppermost position during the counterclockwise oscillation (Figs. 11 and 12) of the bail 282. Thus the function code sensing by the function blades 268 and 269 will be effected early in the cycle of operation of the bail 282 as the bail rocks clockwise (Figs. 11 and 12) and the function blades will not be permitted to move downwardly during the return movement of the bail 282.

Adjacent the upper ends of the arms 283 and 284 of the rocker bail 282, there are pivotally connected to these arms the two arms 325 and 326 of a push bar operating bail 327. As will be seen in Figs. 4 and 11 the push bar operating bail 327 has a guide post 329 fixed to it which slides within a slot 328 formed in a bracket 330 that is formed integrally with the support plate 37. The post 329 is freely slidable within the slot 328 and serves to guide the right hand end (Fig. 4) (left hand end, Fig. 11), of the push bar operating bail 327. Suitably mounted on the upper surface of the push bar operating bail 327 is a push bar operating blade 331 which is of generally U-shaped construction and is formed integrally with the push bar bail 246 (Figs. 4 and 9) that register with the various notches in the push bars 240 to 244, inclusive, when any one of these push bars is selected for operation.

The bell cranks 234 associated with the push bars 240, 241, 242, 243 and 244 have their slots 258 and projection 257 so arranged that when the bell cranks 234 associated with the push bars 240, 241, 242 and 243 are all actuated under the control of the selector mechanism 24 and consequently are rocked counterclockwise as viewed in Fig. 9 these four bell cranks will permit both the Figures function blade 268 and Letters function blade 269 to move down into aligned slots 258 in the upper end of the bell cranks 234. The bell crank 234 associated with the push bar 244 has its slots 258 and projections 257 so arranged that when it is selected and rocked counterclockwise as view in Fig. 9 under the control of the selector mechanism 24 is will permit the Letters functions blade 269 to move downwardly under the influence of its spring 271 and will block the Figures function blade 268 from moving downwardly. On the other hand when the bell crank 234 associated with the push bar 244 is not selected and actuated under the control of the selector mechanism 24, the bell crank 234 associated with the push bar 244 will permit the Figures function blade 268 to move downwardly into the aligned slots 258 on the various bell cranks 234 while it blocks the Letters function blade 269 from moving downwardly under the influence of its spring 271. This arrangement will set up the type wheel positioning mechanism to effect either a "shift" or an "unshift" operation.

A pair of shafts 304 and 305 (Figs. 10) are fixed between the side plates 260 and 261 to rotatably support a pair of sleeves 306 and 307 respectively. At a point closely adjacent the plate 260, the sleeve 306 has a lever 308 fixed to it and also closely adjacent to the plate 260 the sleeve 307 has a lever 309 fixed to it. The levers 308 and 309 are urged to rock in a counterclockwise and clockwise direction respectively by springs 310 and 311 respectively, associated with them. As will be seen by reference to Fig. 10 the levers 308 and 309 have projections 312 and 313 formed on them which are aligned with the Letters function blade 269 and Figures function blade 268 respectively, whereby when the blade 268 is moved downwardly it will rock the lever 308 about the axis of the shaft 304 and when the blade 269 is moved downwardly it will rock the lever 309 about the axis of the shaft 305. The levers 308 and 309 have co-operating notched surfaces at their lower abutting ends as indicated at 314 whereby when one of the levers 308 and 309 is oscillated by its associated function blades 268 and 269 it will remain latched in the position to which it is moved by the arrangement as indicated at 314. As shown in Fig. 10 the lever 309 was the last lever to be rocked and it was rocked in a counterclockwise direction to assume the position shown in this figure. The lever 309 will be rocked into this position and will hold the sleeve 307 on which it is mounted in the position shown in Fig. 10 until the Figures function blade 269 is moved downwardly to rock the lever 309 counterclockwise, in some future cycle the apparatus, at which time the lever 309 will be permitted to rock clockwise under the influence of its spring 311 to assume a position the reverse of that shown in Fig. 10 and when in such position the levers 308 and 309 will be held there until a later cycel of the machine the Letters function blade 268 is again operated.

Fixed to the sleeves 306 and 307 adjacent the side plate 261 are a pair of levers 332 and 333 (Fig. 9) which have bent over ends for engagement with a rounded intermediate area of Letters-Figures bell crank 334 that is pivoted on the stud shaft 235 and has a rounded protuberance 335 on its horizontally extending arm. The protuberance 335 extends into slots 336 formed in a Letters pull bar 337 and a Figures pull bar 338 (Fig. 4) which have shoulders formed on their lower and upper surfaces respectively, for co-operation with the push bar bail 246.

*Type wheel positioning mechanism*

Each of the push bars 240 to 244, inclusive, and the pull bars 337 and 338 upon selection and actuation will actuate a portion of the type wheel positioning mechanism 27 associated with it. The operation of the push bars in setting the type wheel positioning mechanism 27 will be best understood by reference to Figs. 4, 5 and 9. The push bars 240 and 241 control the axial positioning whereas the push bars 242, 243 and 244 control the rotary positioning and the pull bars control the Letters-Figures shifting. The left hand end of the push bar 240 is U-shaped as seen most clearly in Fig. 4 and has a rack 340 formed on it. This rack 340 meshes with a gear 341 (Fig. 16–A) fixed to a shaft 342 which is eccentrically mounted in and freely rotatable within a sleeve 343. The sleeve 343 is in turn freely rotatable within a bearing 344 fixed to a support bracket 345 (Fig. 4) that is in turn suitably secured to the main support plate 263 (Fig. 4). The sleeve 343 has a gear 346 (Fig. 16–A) attached to it intermediate its ends, which gear 346 is in mesh with a rack 347 formed on one of the arms of the U-shaped left hand end of the push bar 241. Fixed to the gear 341 is a plate 348 carrying a stud 349 on it which is eccentric of the axis of rotation of the gear 341 and plate 348.

With this arrangement a movement of the push bar 240 which is sufficient to impart one-half of a revolution to the gear 341 will result in the stud 349 being displaced a predetermined distance which is twice the amount that the stud 349 will be displaced if the push bar 241 rotates the gear 346 through one-half of a revolution. Thus when a half revolution is imparted to the gear 341 and no rotation is imparted to the gear 346 the stud 349 will move two increments of space whereas if the gear 346 is actuated by its associated push bar 241 one increment of movement will be imparted to the stud 349. Consequently, if both the gear 341 and gear 346 are rotated through one-half of a revolution from the position shown in Fig. 16–A by their respective push bars 240 and 241 the stud 349 will be displaced three increments of movement.

The stud 349 drives a rack 350 (Fig. 4) which is pivotally attached to the stud 349 and which will be moved through the same increments of movement that the stud 349 is moved. The rack 350 is held in mesh with a gear segment 351 by a bearing 352 suitably mounted on the plate 345. The gear segment 351 is formed on the right end (Fig. 4) of a lever 353 which is pivotally mounted on a pivot stud 354. The pivot stud 354 (Fig. 5) is fixed to a ribbon oscillating lever 365 which has one end pivotally attached to a ribbon carrier 366 and has a slot in its opposite end into which a pivot pin 367 extends. The pin 367 is attached to an adjustable bracket 368 that is held in place on the bracket 345 by means of a clamping or locking screw 369. The ribbon carrier 366 is slidably suspended on the shouldered heads of screws 370, one of which is shown in Fig. 6 as being fixed to a block 371 formed at the left end of a type wheel shaft bearing 372. The other of the pair of screws 370 is not shown but is mounted on the underside of a block 373 forming another part of the print wheel shaft bearing 372. The two shouldered screws 370 extend into slots 374 and 375 (Fig. 5) formed in the ribbon carrier 366 and guide it for movement, when the ribbon oscillating lever 365 is moved.

The pivot stud 354 also extends through both arms of a pivoted yoke 376 adjacent to the right hand end thereof (Figs. 4 and 5) and also extends through a toggle link 377. The pivoted yoke 376 is pivotally mounted on a stud shaft or pivot pin 383 mounted on the bracket 345. The end of the toggle link 377 opposite to that which is pivotally connected to the pivot stud 354 is pivotally connected to one arm of a bail 384. The opposite arm of the bail 384 is pivotally connected to an oscillating link 385 that is pivoted on the rocker bail 282 so that each time oscillation is imparted to the rocker bail 282 the link 385 will be reciprocated and in reciprocating will rock the bail 384 first in a clockwise direction and then in a counterclockwise direction as viewed in Fig. 4. This oscillation of the bail 384 will cause the lever 353 to be rocked first counterclockwise and then clockwise (Fig. 4) with the teeth of the rack 350 and gear segment 351 serving as a rolling pivot for the lever 353. The oscillation of the bail 384 will also cause the ribbon oscillating lever 365 to be oscillated to move the ribbon carrier 366 first toward the front of the apparatus and then to retract it to the position shown in the drawings (Fig. 4). This will result in the ribbon carrier being retracted from position where it would cover printing on the tape at the end of each cycle of operation of the main rocker bail 282.

The left end of the lever 353 (Fig. 4) has gear teeth 386 cut into it which mesh with complementary teeth on a cylindrical rack 388 which is formed on a type wheel supporting shaft 389. The type wheel supporting shaft 389 is slidably and rotatably mounted in the bearing 372 which is attached to the main support plate 263 and bracket 345. Consequently, when the rack 350 is reciprocated it will cause the lever 353 to be oscillated about the pivot stud 354 and will move the type wheel supporting shaft 389 along its axis an amount proportional to the amount that the rack 350 is reciprocated. This motion of the shaft 389 along its axis is in addition to the movement imparted to the shaft 389 due to the oscillation of the bail 384.

As pointed out hereinbefore the amount of reciprocation imparted to the rack 350 is dependent upon which one or ones of the push bars 240 and 241 are actuated under control of the selector mechanism 24. When the shaft 389 is moved axially to its proper position insofar as it may be accurately located by the linkage mechanisms described hereinbefore, its axial position will be corrected to properly position the type on a type wheel 390 with a print hammer 396 (Fig. 6) by an axial corrector pin 392 (Figs. 3 and 4) which will move into one of a series of notches 400 formed on the inner surface of the left hand end of the lever 353. The axial corrector pin 392 is mounted upon an axial corrector lever 391 oscillatable about a pivot stud 393 which projects upwardly from the support bracket 345. Motion is imparted to the axial corrector lever 391 by a corrector link 394 pivotally connected to the lever 391 at 397 and normally drawn toward the right (Fig. 4) by a contractile spring 395.

The push bars 242, 243 and 244 in co-operation with the pull bars 337 and 338 control the rotary position of the type wheel 390 by imparting reciprocation to a type wheel rack 405 (Figs. 4 and 9) which is held in mesh with a gear 406 on the shaft 389 by an idler pinion 407 mounted on a stud shaft 408 which extends towards the front of the machine from the main support plate 263. The lower end of the type wheel rack 405 is slidable in a slot 409 (Fig. 6) formed in a block 410 attached to a main support plate 263 near the bottom thereof. The gear 406 (Fig. 9) has flat surfaces formed on its central aperture so that the shaft 389 may slide freely with respect to the gear 406 but will rotate with the gear 406 whenever rotation is imparted to the gear. The gear 406 is mounted in a casing 411 (Fig. 4) suitably attached to the main support plate 263 thereby to restrict the gear 406 from moving with the shaft 389 when the shaft 389 is moved longitudinally of its axis.

Intermediate its ends the rack 405 (Fig. 9) has pivotally attached to it a cross arm 412 which may be moved by either one or both of a pair of output arms 413 and 414 that are pivotally connected to the cross arm 412. At their upper ends the output arms 413 and 414 are pivotally attached to eccentric studs 415 and 416, respectively. The studs 415 and 416 are fixed to eccentric plates 417 and 418, (Figs 9, 16-B and 16-C), respectively, that are of the same construction as the plate 348 fixed to the shaft 342 and shown in Fig. 16-A. The plates 417 and 418 have an arrangement of shafting and gearing which is substantially identical with the shafting and gearing shown in Fig. 16-A for moving the rack 350. This gearing arrangement includes the plate 417 (Fig. 16-C) fixed to a gear 419 which is in turn mounted on a shaft 420. The shaft 420 rotates within a sleeve 421 and the sleeve 421 is rotatable in the bearing 422 being fixed to gear 423. Similarly the plate 418 (Fig. 16-A) is fixed to a gear 424 mounted on a shaft 425 that is rotatable eccentrically within a sleeve 426 in turn freely rotatable within a bearing 427. The sleeve 426 has a gear 428 secured to it whereby it may be rotated.

The push bar 242 has a rack 440 (Fig. 9) formed on its upper surface which is held in mesh with the gear 423 by a bracket 441 extending outwardly from the main support plate 263 so that when the push bar 242 is moved to the left it will rotate the sleeve 421 and cause the output arm 413 to be moved downwardly through one increment of movement. If none of the other push bars 243 or 244 are actuated simultaneously with the push bar 242 the leverage arrangement between the output arms 413 and 414 and the cross arm 412 is such that the rack 405 will move downwardly and will cause the type wheel to be displaced in a rotary direction through two units in a clockwise direction (Fig. 9).

The left hand end of the push bar 243 is U-shaped as viewed in Fig. 9 and has a rack formed on the under surface of its upper leg (not shown) which mesh with the gear 428. When the push bar 243 is actuated and thus moved to the left (Fig. 9) it will impart rotation to the gear 428 with which it meshes and will thus cause the output arm 414 to move upwardly through one increment of movement. Due to the leverage arrangement of the output arms 413 and 414 and cross arm 412 this results in the rack 405 being moved downwardly enough to displace the gear 406 through one unit of movement in a clockwise direction (Fig. 9) provided none of the other push bars has been selected and actuated. As pointed out hereinbefore, the push bar 243 is moved to the left (Fig. 9) in each cycle unless its associated bell crank 234 is selected and rocked counterclockwise (Fig. 9).

The push bar 244 is U-shaped at its left hand end (Fig. 9) and has rack teeth 442 formed on the lower surface of its upper leg to mesh with the gear 424. When the push bar 244 is moved to the left (Fig. 9) it will impart 180 degrees of rotation to the gear 424 and consequently will move the output arm 414 downwardly through four increments of movement thus to rotate the gear 406 through four units of rotation in a counterclockwise direction (Fig. 9).

The Letters pull bar 337 is U-shaped at its left hand end (Fig. 9) and has a rack 444 on the lower surface of the upper side of the U-shaped portion and the Figures pull bar 338 has a rack 443 formed on the upper surface of the under portion of its U-shaped left hand end. Both the rack 443 and the rack 444 mesh with the gear 419 and since these pull bars are actuated on the return stroke of the push bar bail 246, selection and actuation of the Letters pull bar 337 will cause the stud 415 to be rotated in a clockwise direction to the position shown in Fig. 9 thus to raise the output arm 413 through four increments of movement and cause the rack 405 to rotate the gear 406 through eight increments of movement in a counterclockwise direction (Fig. 9). Conversely selection and actuation of the Figures pull bar 338 will rotate the gear 419 through a half revolution thus to move the output arm 413 downwardly through four increments of movement and consequently to rotate the gear 406 eight units of movement in a clockwise direction (Fig. 9).

Figure 16:
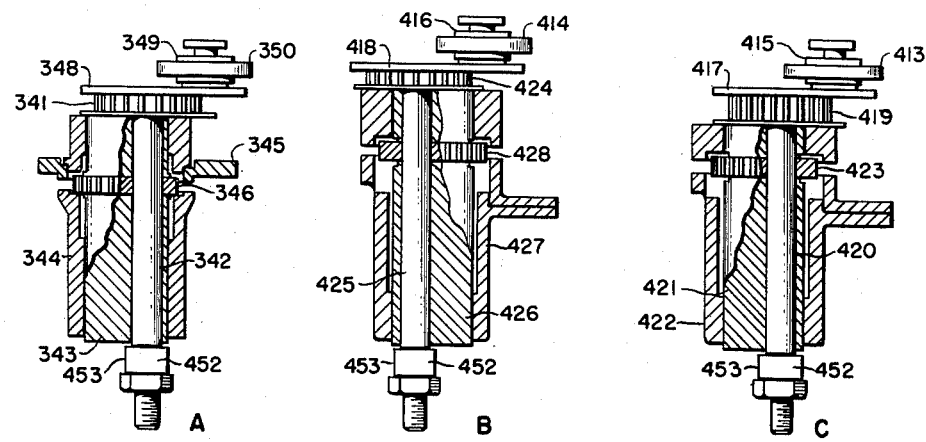
Fig. 16 is a group of fragmentary sectional views through some of the type wheel positioning mechanisms and showing at A a detail sectional view taken substantially along the line A—A of Fig. 4, showing at B a detail sectional view taken substantially along the line B—B of Fig. 9 and showing at C a detail sectional view taken substantially along the line C—C of Fig. 9.
Figure 17:
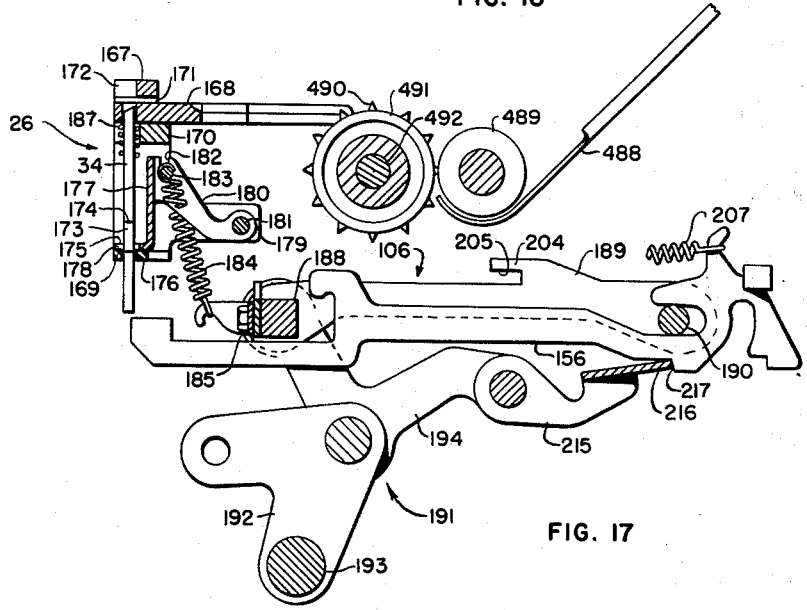
Fig. 17 is a fragmentary sectional view, taken substantially along the line 17—17 of Fig. 6, in the direction of the arrows and showing some details of the punch mechanism.

Each of the shafts 342, 420 and 425 as shown in Figs. 16-A, 16-C and 16-B have collars 452 on them with flattened side surfaces 453 for co-operation with spring pressed retaining levers 454 shown in Fig. 2. The levers 454 resiliently restrain the shafts 342, 420 and 425 from rotating whereby when a shaft is rotated positively by its gear 341, 419 or 424 it will rotate but when the sleeve 343, 421 or 426 associated with the shafts is rotated, the shafts will not rotate but will slide between the levers 454. A similar arrangement (not shown) is provided for resiliently restraining the sleeves 343, 421 and 426.

Once in each cycle of the apparatus the position of the type wheel 390 in a rotary direction will be corrected as was the axial position of the shaft 389 and consequently the type wheel 390. The mechanism for correcting or accurately aligning the type wheel in any of its rotary positions comprises a toothed arm 445 (Fig. 9) having teeth on it which mesh with teeth 446 that ride the idler gear 407. The toothed arm 445 is moved into engagement with the rack 405, after the rack has been set to approximate position by the cross arm 412 and will simply properly align the type wheel 390 to compensate for any play which may be present in the mechanism which positions the type wheel. The toothed arm 445 is fixed to a shaft 447 that extends through the plate 263 and at the rear of the plate 263 has a lever 448 adjustably attached to it which enters into a notch 449 formed in the corrector link 394 (Figs. 2 and 4).

As will be seen by reference to Figs. 2 and 11, the corrector link 394 has a slot 450 formed in it into which there extends a shouldered screw 451 that is attached to the arm 283 of the bail 282. Thus the toothed arm 445 and the axial corrector pin 392 will be held out of registration with the teeth 446 and the notches 400 respectively under the influence of the spring 395 until the bail 282 approaches the end of its clockwise oscillation (Figs. 2 and 11) whereupon the shouldered screw 451 will engage the base of the slot 450 and move the corrector link 394 to the right (Figs. 2 and 11) to the left as viewed in Fig. 4, to move the axial corrector pin 392 and the toothed arm 445 into engagement with the notches 400 and the teeth 446, respectively.

As described hereinbefore the push bars 240, 241, 242, 243 and 244 are selectively operated under the control of the selector mechanism 24. The push bars 240, 241, 242, 243 and 244 are associated with the various selector cams and selector cam levers through the instrumentality of the pulse beams 230, bell cranks 234, push levers 150, and the selector slide latches 153 in the order as shown below:

| Code Interval | Selector Cam | Selector Cam Lever | Push Bar |
| --- | --- | --- | --- |
| 5 | 81 | 101 | 243 |
| 4 | 82 | 102 | 242 |
| 3 | 83 | 103 | 244 |
| 2 | 86 | 106 | 240 |
| 1 | 87 | 107 | 241 |

The reception in the selector mechanism 24, of a marking condition in any one of the various code intervals will cause the selection and actuation of the selector cam levers for that interval. One of the push bars 240 to 244 will be selected for actuation by the push bar bail 246 in each code interval, except for the fifth code interval, whenever a marking condition is received by the selector in those intervals. When a spacing condition is detected by the selector mechanism 24 in the fifth code interval the push bar 243 will be actuated. Since the push bars 240 to 244 will be set into selected positions, to either be actuated or not be actuated by the push bar bail 246, depending upon the condition received in the selector 24, being either spacing or marking, several of the push bars may be actuated at one time, and consequently, the cumulative effect of the actuation of these push bars will influence the degree of rotation and reciprocation of the type wheel 390. Thus the type wheel may be moved from its home position any combination of 0 to 3 units of axial displacement and 0 to 4 units of counterclockwise rotation or 0 to 3 units of clockwise rotation. Of course the type wheel 390 may also be rotated through eight units of clockwise or counterclockwise rotation in response to the receipt in the apparatus of a Letters shift or Figures shift code combination. The code combinations which will produce these displacements of the type wheel may be summarized as follows:

| Code Interval Spacing-Marking | | Displacement of Type Wheel |
|---|---|---|
| 1, 2 | | 0 units axial. |
| 2 | 1 | 1 units axial. |
| 1 | 2 | 2 units axial. |
| | 1, 2 | 3 units axial. |
| 3, 5 | 4 | 3 units rotary clockwise. |
| 3 | 4, 5 | 2 units rotary clockwise. |
| 3, 4, 5 | | 1 units rotary clockwise. |
| 3, 4 | 5 | 0 units rotary. |
| 5 | 3, 4 | 1 units rotary counterclockwise. |
| | 3, 4, 5 | 2 units rotary counterclockwise. |
| 4, 5 | 3 | 3 units rotary counterclockwise. |
| 4 | 3, 5 | 4 units rotary counterclockwise. |
| | 1, 2, 3, 4, 5 | 8 units rotary counterclockwise Ltrs. |
| 3 | 1, 2, 4, 5 | 8 units rotary clockwise Figs. |

When the type wheel is thus selectively rotated and reciprocated it will present a selected character in alignment with the printing hammer 396. A bracket 460 suitably mounted on the main support plate 263 supports a pivot stud 461 on which the printing hammer 396 is freely rotatable. A spring 462 (Fig. 6) urges the printing hammer 396 to rotate in a clockwise direction about the pivot stud 461. The spring 462 has one end connected to the printing hammer 396 and has the other end connected to an arm 463 of a lever 464 which is also oscillatable about the stud shaft 461. The lever 464 has a shoulder 465 which abuts against a flat surface 466 on the printing hammer 396 thus to limit the rotation of the printing hammer in a clockwise direction (Fig. 6) under the influence of the spring 462 which is a relatively light spring and tends to hold the lever 464 and the printing hammer 396 in a fixed position with respect to each other so that when the lever 464 is oscillated about the pivot stud 461 the printing hammer 396 will tend to travel with it. The lever 464 has a bent over portion 467 which will strike a stop member 468 formed on a bracket 469 that is attached to the main bracket 23 thus to limit the counterclockwise oscillation of the lever 464 about the pivot stud 461 under the influence of a relatively heavy spring 458. The spring 458 is attached to the lever 464 and to a pin 470 which extends outwardly from the main support bracket 23. The lever 464 has a pin 471 fixed to it which rides in a slot 472 formed in a print release slide 473.

The print release slide 473 is pivotally attached at its bottom end to a bell crank lever 474 that is pivotally mounted on a shoulder 475 formed on the main supporting bracket 23. The vertically extending leg of the bell crank 474 (Figs. 2 and 6) is pivotally attached to a link 476 which as shown in Figs. 2 and 11 is pivotally attached to the arm 283 and the bail 282. The link 476 will be reciprocated each time the bail 282 is oscillated about the axis of its shaft 285. Consequently, the link 476 will rock the bell crank lever 474 in a clockwise direction (Figs. 2 and 11) when the bail 282 is rocked clockwise and will rock the bell crank 474 counterclockwise when the bail 282 is rocked counterclockwise. This will cause the slide 473 to be moved first downwardly and then to be moved upwardly. As the slide 473 moves downwardly a bent portion 477 (Fig. 2) on the slide 473, will engage an arm 478 (Fig. 6) of a lever 479 to oscillate the lever 479 clockwise (Fig. 6) against the action of a spring 480 attached to the lever 479 and to the pin 470. The lever 479 has a print release latch 481 formed on it which, at this time, will be under and in latching engagement with a shoulder 482 formed on lever 464. When the latch 481 is removed from beneath the shoulder 482 the lever 464 will be snapped in a counterclockwise direction (Fig. 6) under the influence of the relatively heavy spring 458 and will move the printing hammer 396 with it positively, until the bent over portion 467 of the lever 464 strikes the stop member 468 at which time the print hammer will continue to move a short distance stretching the spring 462 due to the inertia in the printing hammer 396. When the print release slide 473 is moved upwardly the bottom of its slot 472 will engage the pin 471 and restore the lever 464 to the position shown in Fig. 6. In moving to the position shown, the lever 464 will cam the lever 479 clockwise against the action of the spring 480 until the shoulder 482 of the lever 464 is above the print release latch 481 whereupon the lever 479 will be moved counterclockwise to latch the lever 464 in the position shown.

When the printing hammer 396 is actuated in the manner just described, it will strike the bottom of a tape (not shown) which has been fed down a tape guide 488 (Figs. 3 and 17) under a roller 489 which has a series of holes extending about its periphery into which pins 490, extending outwardly from a tape feed roller 491, enter. The pins 490 are perforating pins and co-operate with the holes in the roller 489 to perforate feed holes in the tape. The tape will pass up between the roller 489 and the tape feed wheel 491 which is mounted on a shaft 492 that has a pair of feed ratchets 493 and 494 fixed to it (Fig. 3). The tape will be guided to the tape feed slot 171 in the punch (Fig. 6) by a spring pressed guide lever 495. Step by step rotation is imparted to the shaft 492 in each cycle of the apparatus by a feed pawl 496 (Fig. 1) pivotally attached to an arm 497 of the bell crank 192 which forms parts of the toggle mechanism 191. The feed pawl 496 is urged to engage the teeth of the ratchet 494 by a contractile spring 498 which is attached to the feed pawl and to a retainer pawl 499 that is urged to engage the ratchet 494 by a contractile spring 500 attached to an adjustable arm 501 adjustably mounted on the bell crank 192. A knurled thumb nut 502 is also fixed to the shaft 492 whereby the tape may be advanced manually through the apparatus.

When the printing hammer 396 is driven upwardly and strikes the under surface of the tape it will drive the tape into engagement with an inked ribbon 510 which is guided into position under the type wheel 390 by the ribbon carrier 366 (Fig. 1).

Ribbon feed mechanism

The ribbon feed mechanism 28 (Fig. 1) is supported on an irregularly shaped plate 511 supported on a pair of posts 512, only one of which is shown, that extend forwardly from the main support plate 263. A pair of shafts 513 and 514 extend forwardly from the plate 511 and have mounted on them a pair of ratchet wheels 515 and 516 respectively, to which suitable spools 517 and 518 may be attached by any suitable locking means such as are usually provided in such mechanisms. The teeth on the ratchet wheels 515 and 516 are inclined in opposite directions for co-operation with a double pawl 519. The double pawl 519 is pivoted on a pivot pin 520 fixed to a drive arm 521 which is in turn pivoted on the plate 511 at 522 and normally urged to rock in a counterclockwise direction about its pivot by a spring (not shown). The counterclockwise oscillation (Fig. 1) of the drive arm 521 is limited by stop member 523 fixed to the plate 511.

As shown in the drawings the double pawl 519 is in engagement with the ratchet wheel 515 and is held in that position by a contractile spring 524 attached to the middle of the double pawl 519 at its upper end. The other end of the contractile spring 524 is attached to the mid-point of the bottom of a U-shaped reversing lever 525 that is pivoted on the plate 511 by means of a pivot stud 526. The upper end of the reversing lever 525 is U-shaped and between the legs of the U-shaped portion thereof it receives the lower, rounded end of the double pawl 519.

It will be obvious by reference to Fig. 1 that the double pawl 519 and the reversing lever 525 will be held in the position shown by the spring 524 until either the lever 525 or pawl 519 is moved beyond center with respect to their pivots so that the pawl 519 and the lever 525 may be reversed to cause the pawl 519 to engage the ratchet wheel 516. The pawl 519 has a pair of laterally extending arms 526 and 527 which may be engaged by vertically disposed ends of either one of a pair of reversing arms 528 or 529 respectively.

The reversing arms 528 and 529 are normally held in the position shown in Fig. 1 by a contractile spring 530 that is attached to the mid-point of the arm 529 and to the upper end of the lever 528. The reversing arms 528 and 529 have guide pins 531 on them between which the ribbon 510 passes. As is usual in inked ribbon devices, the ribbon has rivets in it near each end which will not pass between the pins 531 on the arms 528 and 529. Consequently, when this rivet engages the pins 531 it will rock the lever 528 or the lever 529, the pins on which it engages, against the action of the spring 530. This will cause the upper end of whichever lever is rocked to move into the path of the arm 526 or the arm 527 of the double pivot 519 when the drive arm 521 is moved to the position shown in Fig. 1 under the influence of its spring not shown. When this occurs the double pawl 519 will be rocked about its pivot to the opposite position. When the pawl 519 is rocked to either one of its operative positions it will rock the reversing lever 525 about its pivot 526 and will remain in that position due to the action of the spring 524. The bottom end of the reversing lever 525 has a pair of projections on it which extend toward the rear of the machine and will engage either one or the other side of a double retaining pawl 532. The pawl 532 will thus engage with whichever one of the ratchet wheels 516 or 515 that the double pawl 519 is in engagement with. The ribbon is directed between the pins 531 on the reversing arms 528 and 529 by a pair of guide rollers 533 and 534 suitably mounted on the plate 511.

A vertically extending portion of the drive arm 521 extends into the path of an actuator roller 535 on the upper end of the arm 284 of the bail 282, thus the arm 521 will be rocked clockwise about its pivot 522 once in each cycle of operation of the apparatus thereby to move the double pawl 519 upwardly and to step the ratchet wheel 515 or 516 with which the pawl 519 has been engaged one step. Since the ratchet wheels are driven one step on each cycle of the apparatus a fresh portion of the inked ribbon 510 will be presented to the type wheel 390 in each cycle and when the inked ribbon supply on one spool is almost exhausted either the reversing arm 528 or the reversing arm 529 will be actuated to reverse the position of the double pawl 519 and 532 thus to rewind the inked ribbon 510 onto the spool from which it had been withdrawn.

*Tape out mechanism*

Figure 13:
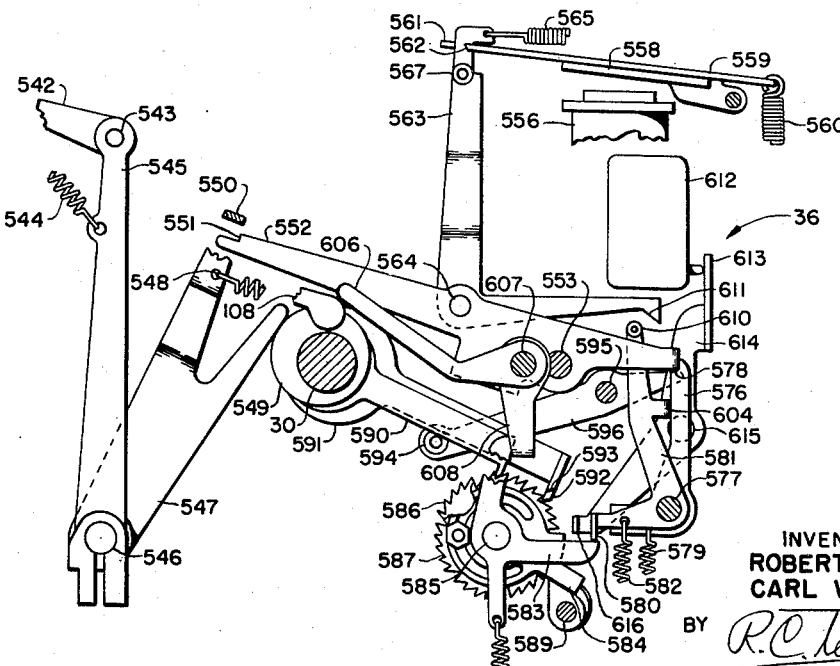
Fig. 13 is a fragmentary, irregular sectional view taken substantially along the line 13—13 of Fig. 3 in the direction of the arrows showing portions of a tape feed-out mechanism forming a part of the reperforator, parts of the supporting structure being left out in order more clearly to illustrate the operation of the mechanism.

The ratchet 493 on the shaft 492, which drives the tape feed wheel 491, has associated with it a pawl 542 (Figs. 1, 3 and 13). This pawl 542 is normally urged to rock in a counterclockwise direction about a pivot pin 543 by a contractile spring 544 which is attached to the pawl 542 and to an oscillatable lever 545 which carries the pivot pin 543 at its upper end. The lever 545 is fixed to an oscillatable shaft 546 suitably journaled on the base 21 of the apparatus and extending from the front portion of the machine substantially to the rear thereof. Adjacent the rear end of the shaft 546 there is fixed to it a cam follower lever 547 that is normally urged to rock in a clockwise direction by a spring 548. The upper end of the cam follower lever 547 is forked and one furcation of the forked portion is urged, by the spring 548, to engage an eccentric 549 fixed to the shaft 30. The other furcation of the lever 547 has a laterally extending portion 550 that is normally engaged by a shoulder 551 on a release arm 552 so that under normal conditions the shoulder 551 will hold the cam follower lever 547 out of contact with the eccentric 549 and no oscillation will be imparted to the lever 545. Consequently, under normal conditions, the pawl 542 will not be reciprocated but will ride over the teeth of its associated ratchet wheel 493 when the shaft 492 is actuated by the ratchet wheel 494.

The release arm 552 is pivoted on a stud shaft 553 mounted on an auxiliary plate 554, not shown in Fig. 13 but shown in Figs. 1 and 2, and which is mounted on the base 21 of the apparatus adjacent to the rear edge thereof. A bracket 555, Fig. 1, also mounted on the plate 554, supports an electromagnet 556 and has a bent over portion 557 for pivotally supporting an armature 558, associated with the electromagnet 556, and mounted on an armature bail 559. The armature 558 and bail 559 are urged to rock in a clockwise direction (Fig. 13) about their pivot by a contractile spring 560 attached to the end of the bail and to the bracket 555 (Fig. 1). The bail 559 has a slot formed in it at its left hand end (Fig. 13) to form two extensions 561 and 562 which extend on opposite sides of an armature lock lever 563 that is pivotally mounted on a release arm 552 by means of pivot pin 564 and that is urged to rock about the pin 564 by a contractile spring 565. The spring 565 normally holds the upper end of an armature lock lever 563 in position between the extension 561 and 562 on the bail 559.

When the electromagnet 556 is energized and attracts its armature 558, the armature will cause the bail 559 to be rocked counterclockwise about its pivot (Fig. 13). When the bail 559 is rocked counterclockwise, it will cause the extension 562 to engage a roller 567 that is freely, rotatably mounted adjacent to the upper end of the armature lock lever 563 and push the armature lock lever downwardly. When the lever 563 is pushed downwardly it will move the release arm 552 counterclockwise about its pivot 553 (Fig. 13) thus to disengage the shoulder 551 on the release arm 552 from the laterally extending portion 551 of the cam follower lever 547.

As soon as the release arm 552 is rocked counterclockwise (Fig. 13) about its pivot 553, it will be latched in the position shown in Fig. 13 by a latching bell crank 576 pivoted on a stud 577 extending outwardly from the auxiliary plate 554. The latching bell crank 576 is provided with a latching shoulder 578 that engages the right hand end (Fig. 13) of the release arm 552 and will hold the release arm in the position shown in Fig. 13. The latching bell crank 576 is normally urged to rotate in a counterclockwise direction (Fig. 13) about its stud 577 by a contractile spring 579 but may be rocked from the position shown in Fig. 13 to release the arm 552. A latch releasing bell crank lever 581, also pivoted on the stud 577, is normally urged to rock to the position shown in Fig. 13 by a contractile spring 582.

The bell crank lever 581 has a laterally extending projection 580 on its horizontally disposed arm which lies in the path of a bell crank lever 583 and an arm 584 both of which are oscillatable about a shaft 585. The shaft 585 is fixed to the plate 554 and carries, in addition to the bell crank 583 and the arm 584, a pair of ratchets 586 and 587. The arm 584 is adjustably fixed to the ratchet 587 which is normally urged to return to a home position as indicated in Fig. 1 by a contractile spring 588 which is not shown in Fig. 13. A spring pressed pawl 589 blocks rotation of the ratchet 586 in a clockwise direction. A retainer pawl 590 in the position shown in Fig. 13 engages with the teeth of the ratchet 587 and prevents its rotation in a clockwise direction. The retainer pawl 590 is mounted concentrically on the shaft 30 and is spring urged to engage with the teeth of the ratchet 587. A driving pawl 591 is driven by an eccentric (not shown) but mounted on the shaft 30 and is normally spring urged to engage a pair of teeth 592 and 593 formed on its right hand end (Fig. 13) with the teeth of the ratchets 586 and 587 respectively. It should be noted that the tooth 593 is shorter than the tooth 592. Thus the tooth 592 will engage with the teeth of the ratchet 586 each time the driving pawl 591 is reciprocated provided that the pawl 591 has been released so that the tooth 592 may engage with the ratchet 586. The ratchet 586 has every sixth tooth cut deeper than the rest of the teeth about its periphery and consequently the tooth 592 will engage in the teeth of the ratchet 586 and drive it step by step without the tooth 593 engaging the ratchet 587 until six steps of the ratchet 586 have occurred whereupon the tooth 592 in engaging the deeper tooth will permit the tooth 593 to drop down low enough to engage with the teeth on the ratchet 587. Thus it will be seen that the ratchet mechanism has a six to one reduction designed into it and when the arm 584 is set with respect to the ratchet 587 any desired number of steps within the limit of the number of teeth on the two ratchets may take place before the arm 584 will engage with the laterally extending projection 580.

Under normal conditions the driving pawl 591 and retainer pawl 590 are held up out of engagement with the ratchets 586 and 587 by a pin 594 which extends beneath them and is mounted on a lever 596 that is pivotally mounted on a pin 595 fixed to the plate 554. The right hand end of the lever 596 extends under a portion of the release arm 552 and, when the release arm 552 is rocked counterclockwise to the position shown in Fig. 13, the lever 596 will be permitted to rock counterclockwise about its pivot stud 595 and permit the pawls 590 and 591 to engage with the ratchet wheels 586 and 587.

From the foregoing it is believed to be apparent that each time the electromagnet 556 is energized it will attract its armature 558 and in so doing will rock the bail 559 in a counterclockwise direction about its pivot against the action of the spring 560. As the bail 559 is rocked counterclockwise (Fig. 13) the extension 562 thereon will engage the roller 567 and will depress the armature lock lever 563 thereby to rock the release arm 552 about its pivot 553 and unlatch the cam follower lever 547 to permit it to drop down and engage eccentric 549 thus to impart reciprocation to the cam follower lever 547 and consequently impart reciprocation to the pawl 542 to cause the tape to be fed out of the apparatus step by step. When the release arm 552 is rocked to the position shown in Fig. 13 it will be latched in that position by the latching bell crank 576 and in moving to the position shown in Fig. 13 the release arm 552 will permit the lever 596 to be rocked counterclockwise about its pivot 595 to drop the pawls 590 and 591 down into engagement with the ratchets 586 and 587 thereby to start a counting of the number of steps of reciprocation that are imparted to the pawl 542.

The tape feed-out mechanism is non-interfering and consequently is so arranged that the reception of a start signal in the selector mechanism 24 will disable the tape feed mechanism. The first cam which is effective to perform any operation in the selector mechanism is the reset cam 88 which will actuate the reset bail 108. There is associated with the reset bail 108 a lever 606 which is fixed to a shaft 607 journaled in the bracket 330 and extending from the front area of the machine at the selector mechanism 24 back to a point near the rear of the machine.

The shaft 607 has a lever 608 attached to it, at the rear end of it, that has a horizontally disposed portion for engagement with the upwardly extending arm of the bell crank lever 583. With this arrangement, the reception of a start signal by the selector mechanism 24 will result in the reset bail cam lever 108 being moved upwardly as viewed in Fig. 13 to rock the lever 606 and consequently the shaft 607 and lever 608 in a clockwise direction about the axis of the shaft 607. This will cause the bell crank 583 to be rocked counterclockwise about the shaft 585. As the bell crank lever 583 rocks counterclockwise (Fig. 13) it will rock the latching bell crank 576 counterclockwise about the stud 577 to release the right hand end of the release arm 552 from the latching shoulder 578. The bell crank 583 does not engage the latching bell crank 576 directly but will rock the latch releasing bell crank lever 581 clockwise about the stud 577 to carry a laterally extending projection 609 on the lever 581 into engagement with the lever 576 to rock the lever 576 clockwise.

At its upper end the latch releasing bell crank lever 581 has a roller 610 mounted on it which, when the lever 581 is rocked clockwise about the stud 577, will engage a camming surface 611 on the horizontally disposed arm of the armature lock lever 563 provided the electromagnet 556 is energized at this time. If the electromagnet 556 is energized at the time when a signal is received by the selector mechanism 24 the lever 581 will be rocked clockwise from the position shown in Fig. 13 to engage the roller 610 with the camming surface 611 thereby to rock the armature lock lever 563 about the pivot pin 564. When this occurs the extension 562 will roll off of the roller 567 and although the armature 558 is in its operated position the release arm 552 will be permitted to move upwardly to block oscillation of the cam follower lever 547.

At the end of a tape feed-out operation whether this is caused by the reception of a signal in the selector mechanism 24 or by the completion of the feeding out of a measured amount of tape a signal indicating that the tape feed-out has stopped will be given by operating a switch 612. The switch 612 is mounted on the rear of the auxiliary plate 554 and is operated by a bent over portion 613 of a lever 614 that is pivoted on the plate 554 at pivot pin 615 and carries an extension 616 in the path of the bell crank lever 583 and the arm 584.

*Operation*

Figure 19:
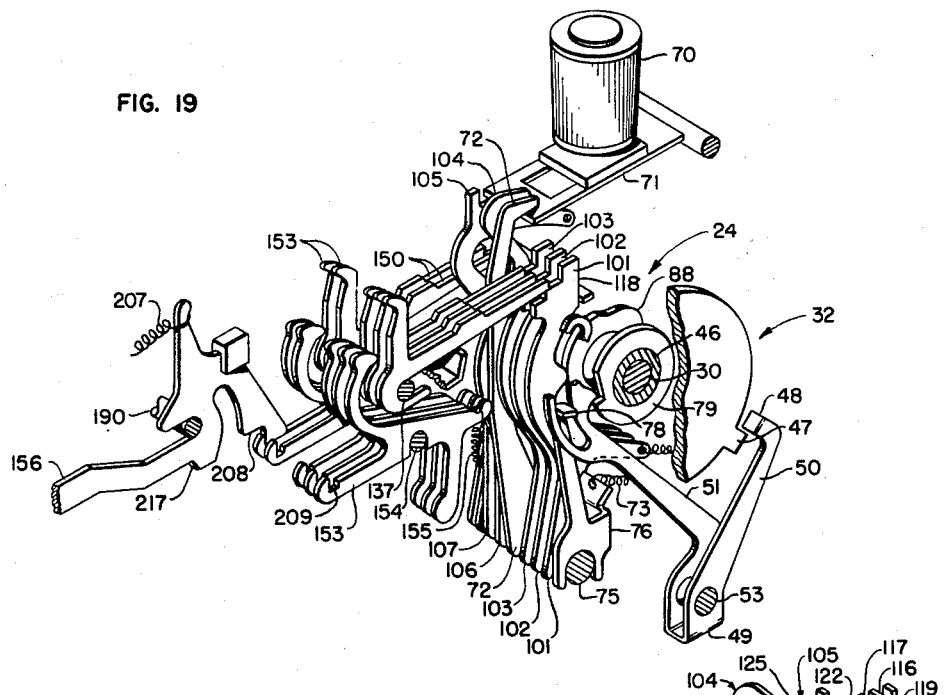
Fig. 19 is a fragmentary perspective view showing parts of the selector mechanism.

During the time in which a closed line circuit (marking) condition exists, the selector magnet coils 70 are energized and hold the selector armature 71 against the pole pieces of the selector magnet. This stop condition of the selector armature blocks the start lever 72 (Figs. 7 and 19). At the start of any signal, for any character or function, the start (spacing) interval releases the selector armature 71 and unlatches the start lever 72 which will rock in a clockwise direction (Figs. 7 and 19). As the start lever 72 rocks clockwise, the projection 78 (Figs. 1 and 15) on it will rock the stop bail 49 clockwise about its stud shaft 53 to move the end portion 48 of the stop bail 49 out of the path of the stop projection 47 to initiate a cycle of operation of the selector clutch drum 45 and consequently to initiate a cycle of the selector cam sleeve 46. At the completion of a cycle of the selector cam sleeve 46 and when a stop impulse at the end of a signal is received the selector armature 71 is pulled up to again block the start lever 72.

During the cycle of rotation of the selector cam sleeve 46 the five selecting levers 101, 102, 103, 106 and 107 will respond to marking-spacing conditions in the sequence indicated in Fig. 14 when they will enter or be blocked from entering the indents in their respective cams 81, 82, 83, 86 and 87. The marking lock cam lever 105 will of course, as described hereinbefore, oscillate clockwise about the pivot shaft 75 each time a marking signal is received and will permit the various selector levers to move into the indent of their associated cams. Any selector lever 101, 102, 103, 106 or 107 which is permitted to rock clockwise about the shaft 75, due to a marking condition prevailing at the time when its associated cam presents an indent or low portion to it, will permit its associated push lever 150 to drop to the lower push bar engaging shoulder 117. Thus as soon as any selector lever, which has been selected, is restored to its normal position by riding up onto the high portion of its associated cam, will push its push lever 150 to the left as viewed in Figs. 7 and 19 to rock its associated selector slide latch 153 about the shaft 154 thereby to release the punch selector slide 156, associated with it, from the slide latch 153. Any punch selector slide 156 which is released by its associated latch 153 will be moved to the left (Figs. 7 and 19) by its associated spring 207 to carry its head portion 211 under its associated punch 34 and to engage the shoulder 210 on it with the cross bar 188 as shown in Fig. 8.

As each of the punch selector slides 156, which has been selected for operation, moves to the left (Figs. 7, 8 and 19) it will actuate its associated U-shaped lever 225 and through the arrangement of transfer beams or pulse beams 230 will rock its associated bell crank 234 thereby to move the push bars 240, 241, 242, 243 and 244, which have thus been selected, into engagement with the push bar bail 246 in the case of the push bars 240, 241, 242 and 244 and to disengage the push bar 243 from the push bar bail 246.

The coded representation of the signals which has been received in the selector mechanism 24 will thus be transferred to the punch selector slides 156 and from the punch selector slides 156 to the push bars 240 to 244. After the selective positioning of the punch selector slides 156 and the push bars 240 to 244 has been effected, the function clutch cam 89 on the selector cam sleeve 46 will trip the function clutch 33 and initiate a cycle of operation of the rocker bail 282. When the rocker bail 282 is oscillated in a clockwise direction, as viewed in Figs. 2 and 11, any of the push bars 240 to 244 that have been selected for actuation will be first reciprocated to the left as viewed in Figs. 4 and 9 thus selectively to actuate the eccentrics that impart reciprocation and rotation to the type wheel 390. When the type wheel 390 is properly positioned the printing hammer 396 will drive the inked ribbon 510 against the tape and force the tape into engagement with selected type character on the type wheel 390.

In the event that a "Shift" or "Unshift" signal has been received in the selector mechanism either the Letters function blade 268 or the Figures function blade 269 will be permitted to drop down in the function box under the action of their respective springs 271 thereby to shift the position of the levers 308 and 309 in the function box 259 and impart movement to the Letters-Figures bell crank lever 334 which would engage either the Letters pull bar 337 or the Figures pull bar 338 with the push bar bail 246. If either the Letters pull bar 337 or Figures pull bar 338 is thus selected for operation by the push bar bail 246, the push bar bail 246 will, upon the oscillation of the bail 282 in a counterclockwise direction (Figs. 2 and 11), pull the selected pull bar to the right as viewed in Fig. 9 to rotate the type wheel 390 through 180 degrees to effect the "Shift" or "Unshift" operation. When the type wheel 390 is rotated through 180 degrees due to the "Shift" or "Unshift" signal having been received in the apparatus the Letters and Figures pull bars 337 and 338 respectively will be held in the position to which they are moved upon the retraction of the push bar bail 36 to the position shown in Fig. 9 and they will remain in that position until signals are received in the selector mechanism 24 calling for a reversal of the Shift or Unshift operation.

At any time that signals are not being sent into the selector mechanism 24 the electromagnet 556 may be energized to initiate a tape feed out operation. Upon the initiation of a tape feed out operation the operation will continue until a signal is received in the selector mechanism 24 or until a metered quantity, as determined by the setting of the arm 584 with respect to the ratchet 587, has been fed out of the apparatus.

It is to be understood that the above-described arrangements are simply illustrative of the application of the principles of the invention. Numerous other arrangements may be readily devised by those skilled in the are which will embody the principles of the invention and fall within the spirit and scope thereof.

What is claimed is:

1. In a printing telegraph reperforator, a function mechanism comprising a plurality of slidably mounted function members, an oscillatory member normally holding said function members in an inoperative position, means for imparting oscillation to said oscillatory member to release said function members for movement, means activated by said function members for effecting functions of said reperforator, a selector mechanism responsive to a permutation code of signals, a plurality of coded members settable by said selector mechanism for controlling the movement of said function members, and means for actuating the means activated by said function members.

2. In a printing telegraph typing reperforator, a type wheel having a letters position and a figures position, means connected to said type wheel for moving it from one of said positions to the other position, a plurality of push bars for moving said type wheel to select a character for printing when the type wheel is in either its letters position or its figures position, a selector mechanism for selectively positioning said push bars for actuation, a push bar actuator means for actuating those push bars which have been selected for actuation by the selector mechanism, a plurality of coded members settable with the push bars under control of said selector means, a plurality of function blades associated with said coded members for controlling the functions of the apparatus, cyclically operable means for moving said function blades into operative association with said coded members, and means actuated by said function blades when said coded members are set in predetermined positions for operatively connecting said means connected to the type wheel to said push bar actuator.

3. In a printing telegraph typing reperforator, a type wheel having a letters position and a figures position, a letters pull bar for moving the typewheel to its letters position, a figures pull bar for moving the type wheel to its figures position, a push bar bail for actuating either the figures or letters pull bar, means for selectively moving said bars to operative position to be operated by said push bar bail comprising a signal controlled selector mechanism, a plurality of bell crank levers selectively actuated under control of said selector mechanism, each of said bell cranks having code notches formed on it, a letters function blade mounted for movement toward and away from said notches, a figures function blade mounted for movement toward and away from said coded notches, resilient means for urging said blades to enter said notches, a blade lifter for moving said blades away from said notches, means for imparting oscillatory movement to said blade lifter once in each cycle of the reperforator to release said function blades for movement towards said notches, a first lever having a projection aligned with said figures function blade for engagement and actuation by said figures function blade, a second lever having a projection aligned with said letters function blade for engagement and actuation by said letters function blade, a latching arrangement formed on adjacent surfaces of said first and second levers, resilient means urging the levers to a position where said latching arrangement will hold the levers against movement with respect one to another when one of the levers has been actuated by its associated function blade, a bell crank lever associated with the letters pull bar and figures pull bar, and means actuated by said first or second lever to actuate said bell crank lever to cause it to move either the figures pull bar or the letters pull bar into operative association with the push bar bail.

4. In a printing telegraph reperforator, a signal controlled selector mechanism responsive to a permutation code of signals, a plurality of permutatively settable elements settable under control of said selector mechanism and having coded notches formed in them, and a function mechanism operable under control of said settable elements comprising a plurality of function blades normally urged to assume a function effecting position, a member operable to hold said blades during a predetermined portion of the cycle of the reperforator and to release them at another portion of the cycle to contact said settable elements and sense them for an alignment of notches, and means activated by said function blades to effect functions of the reperforator.

5. In a printing telegraph typing reperforator, a signal controlled selector mechanism responsive to a permutation code of signals, a plurality of permutatively settable bell crank members having coded notches in them and settable under control of said selector mechanism, and a function mechanism operable under control of said members comprising a plurality of function blades normally urged to assume a function effecting position, an oscillatory member operable to hold said blades during a predetermined portion of the cycle of the reperforator and to release them at another portion of the cycle to sense said bell cranks for an alignment of notches, and means activated by said function blades to effect functions of the reperforator.

6. In a printing telegraph reperforator, a function mechanism comprising a pluraltiy of slidably mounted function blades, an oscillatory member normally holding said function blades in an inoperative position, a cam for imparting oscillation to said oscillatory member to release said function blades for movement when said cam moves in one direction, a latch for holding said oscillatory member out of operative association with said cam when said cam moves in the other direction and means activated by said function blades for effecting functions of said reperforator, a selector mechanism responsive to a permutation code of signals, a plurality of coded members settable by said selector mechanism for controlling the movement of said function blades, and means for actuating the means activated by said function blades.

7. In a printing telegraph reperforator, a type wheel having a letters position and a figures position, means connected to said type wheel for moving it from one of said positions to the other position, a plurality of push bars for moving said type wheel to select a character for printing when the type wheel is in either its letters position or its figures position, a selector mechanism for selectively positioning said push bars for actuation, a push bar actuator means for actuating those push bars which have been selected for actuation by the selector mechanism, a plurality of bell crank members having coded notches in them and settable with the push bars under control of said selector means, a plurality of function blades associated with said bell crank members for controlling the functions of the apparatus, cyclically operable means for moving said function blades into operative association with said bell crank members to sense said members for an alignment of notches, and means actuated by said function blades when said blades find an alignment of notches for operatively connecting said means connected to the type wheel to said push bar actuator.

8. In a printing telegraph typing reperforator, a type wheel having a letters position and a figures position, means connected to said type wheel for moving it from one of said positions to the other of said positions, a plurality of push bars for moving said type wheel to select a character for printing when the type wheel is in either its letters position or its figures position, a selector mechanism for selectively positioning said push bars for actuation, a push bar actuator means for actuating those push bars which have been selected for actuation by the selector mechanism, a plurality of coded members having coded notches in them settable with the push bars under control of said selector means, a plurality of function blades associated with said coded members for controlling the functions of the apparatus, cyclically operable means for moving said function blades into operative association with said coded members, and lever means individual to said function blades for actuation by said blades when said coded members are set in predetermined positions with notches in them in alignment for operatively connecting said means connected to the type wheel to said push bar actuator.

9. In a printing telegraph typing reperforator, a type wheel having a letters position and a figures position, a letters pull bar for moving the type wheel to its letters position, a figures pull bar for moving the type wheel to its figures position, a push bar bail for actuating either the figures or letters pull bar, means for selectively moving said bars to operative position to be operated by said push bar bail comprising a signal controlled selector mechanism, means having code notches formed on it and selectively actuated under control of said selector mechanism, a letters function blade mounted for movement toward and away from said notches, a figures function blade mounted for movement toward and away from said coded notches, resilient means for urging said blades to enter said notches, a blade lifter for moving said blades away from said notches, means for imparting oscillatory movement to said blade lifter once in each cycle of the reperforator to release said function blades for movement towards said notches, a first lever having a projection aligned with said figures function blade for engagement and actuation by said figures function blade, a second lever having a projection aligned with said letters function blade for engagement and actuation by said letters function blade, a latching arrangement formed on adjacent surfaces of said first and second levers, resilient means urging the levers to a position where said latching arrangement will hold the levers against movement with respect to one another when one of the levers has been actuated by its associated function blade, and means actuated by said first or second lever to move either the figures pull bar or the letters pull bar into operative association with the push bar bail.

10. In a printing telegraph typing reperforator including a type wheel having a letters position and a figures position, a letters pull bar for moving the type wheel to its letters position, a figures pull bar for moving the type wheel to its figures position, and a push bar bail for actuating either the figures or letters pull bar, means for selectively moving said bars to operative position to be operated by said push bar bail comprising a signal controlled selector mechanism, a plurality of permutatively settable elements selectively actuated under control of said selector mechanism and having code notches formed on them, a letters function blade mounted for movement toward and away from said code notches, a figures function blade mounted for movement toward and away from said code notches, resilient means for urging said blades to enter said notches, a blade lifter for moving said blades away from said notches, means for imparting oscillatory movement to said blade lifter once in each cycle of the reperforator to release said function blades for movement towards said notches, a first lever having a projection aligned with said figures function blade for engagement and actuation by said figures function blade, a second lever having a pro-jection aligned with said letters function blade for engagement and actuation by said letters function blade, a latching arrangement formed on adjacent surfaces of said first and second levers, resilient means urging the levers to a position where said latching arrangement will hold the levers against movement with respect to one another when one of the levers has been actuated by its associated function blade, and means actuated by said first or second lever to move either the figures pull bar or the letters pull bar into operative association with the push bar bail.

References Cited in the file of this patent

UNITED STATES PATENTS

| | | |
|---|---|---|
| 630,827 | Hachmann | Aug. 8, 1899 |
| 1,506,381 | Pierce | Aug. 26, 1924 |
| 2,102,899 | Klienschmidt | Dec. 21, 1937 |
| 2,308,543 | Reiber | Jan. 19, 1943 |
| 2,352,925 | Walker | July 4, 1944 |
| 2,354,115 | Gubisch | July 18, 1944 |

UNITED STATES PATENT OFFICE
CERTIFICATE OF CORRECTION

Patent No. 2,951,902                                September 6, 1960

Robert E. Arko et al.

It is hereby certified that error appears in the printed specification of the above numbered patent requiring correction and that the said Letters Patent should read as corrected below.

Column 13, line 48, for "surface" read -- surfaces --; column 14, line 21, for "view" read -- viewed --; line 22, for "is" read -- it --; line 35, for "Figs. 10" read -- Fig. 10 --; line 63, after "cycle" insert -- of --; line 68, for "cycel" read -- cycle --; column 25, line 57, for "would" read -- will --; line 71, for "36" read -- 246 --; column 26, line 12, for "are" read -- art --.

Signed and sealed this 25th day of April 1961.

(SEAL)

Attest:

ERNEST W. SWIDER
Attesting Officer

DAVID L. LADD
Commissioner of Patents